United States Patent
Ang et al.

(10) Patent No.: US 10,973,018 B2
(45) Date of Patent: Apr. 6, 2021

(54) WIRELESS RESOURCE BLOCKS WITH INTEGRATED CONTROL AND DATA

(71) Applicant: QUALCOMM Incorporated, San Diego, CA (US)

(72) Inventors: Peter Pui Lok Ang, San Diego, CA (US); Tao Luo, San Diego, CA (US); Tingfang Ji, San Diego, CA (US); Jing Jiang, San Diego, CA (US); Jamie Menjay Lin, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/359,541

(22) Filed: Nov. 22, 2016

(65) Prior Publication Data
US 2017/0150486 A1    May 25, 2017

Related U.S. Application Data

(60) Provisional application No. 62/258,968, filed on Nov. 23, 2015, provisional application No. 62/267,180, filed on Dec. 14, 2015.

(51) Int. Cl.
*H04J 1/02* (2006.01)
*H04L 5/00* (2006.01)
(Continued)

(52) U.S. Cl.
CPC ........ *H04W 72/044* (2013.01); *H04B 7/0452* (2013.01); *H04J 1/02* (2013.01);
(Continued)

(58) Field of Classification Search
None
See application file for complete search history.

(56) References Cited

U.S. PATENT DOCUMENTS

| 2004/0160936 A1* | 8/2004 | Liu ................... H04W 72/1268 370/348 |
| 2006/0128309 A1 | 6/2006 | Dateki et al. |

(Continued)

FOREIGN PATENT DOCUMENTS

| CN | 101064577 A | 10/2007 |
| CN | 101305538 A | 11/2008 |

(Continued)

OTHER PUBLICATIONS

ISA/EP, International Search Report and Written Opinion of the International Searching Authority, Int'l Application No. PCT/US2016/063510, dated Mar. 2, 2017, European Patent Office, Rijswijk, NL, 13 pgs.

(Continued)

*Primary Examiner* — Ayaz R Sheikh
*Assistant Examiner* — Tarell A Hampton
(74) *Attorney, Agent, or Firm* — Holland & Hart LLP

(57) ABSTRACT

Transmission of user equipment (UE) specific control information within a resource allocation including resource blocks allocated for downlink transmissions to the UE is disclosed. Common control information may be provided in a first transmission time interval (TTI)-level control region, and UE-specific control information, specific to a particular UE, may be provided along with data in allocated downlink resources to the UE. A base station may identify a resource block (RB) for transmission of data to a UE along with UE-specific control information to be included in the RB. The control information may include, for example, parameters for use by the receiver in demodulating the RB. The base station may multiplex the control information with the data within the RB and transmit the RB and control information.

30 Claims, 18 Drawing Sheets

(51) Int. Cl.
*H04W 72/04* (2009.01)
*H04B 7/0452* (2017.01)

(52) U.S. Cl.
CPC .......... *H04L 5/0044* (2013.01); *H04L 5/0051* (2013.01); *H04L 5/0007* (2013.01); *H04L 5/0094* (2013.01)

(56) References Cited

U.S. PATENT DOCUMENTS

| | | | |
|---|---|---|---|
| 2008/0095110 A1* | 4/2008 | Montojo | H04L 5/0053 370/330 |
| 2008/0212464 A1 | 9/2008 | Kim et al. | |
| 2009/0238123 A1* | 9/2009 | Kuri | H04L 1/0003 370/329 |
| 2009/0296644 A1* | 12/2009 | Cheon | H04L 1/0031 370/329 |
| 2010/0054203 A1* | 3/2010 | Damnjanovic | H04W 72/042 370/329 |
| 2010/0150096 A1* | 6/2010 | Choi | H04L 1/0025 370/329 |
| 2010/0260164 A1* | 10/2010 | Moon | H04L 5/0007 370/345 |
| 2011/0271168 A1* | 11/2011 | Han | H04L 1/0027 714/807 |
| 2012/0063384 A1* | 3/2012 | Bi | H04B 7/15557 370/315 |
| 2012/0134335 A1* | 5/2012 | Jia | H04B 7/0417 370/329 |
| 2013/0114533 A1 | 5/2013 | Ji et al. | |
| 2013/0128768 A1* | 5/2013 | Balasubramanian | H04L 1/0038 370/254 |
| 2013/0301597 A1 | 11/2013 | Kim et al. | |
| 2013/0336252 A1* | 12/2013 | Hsieh | H04L 5/0053 370/329 |
| 2014/0307680 A1* | 10/2014 | Zhang | H04L 1/1861 370/329 |
| 2014/0328260 A1* | 11/2014 | Papasakellariou | H04L 1/1861 370/329 |
| 2017/0142712 A1* | 5/2017 | Lee | H04W 72/0446 |
| 2019/0165839 A1* | 5/2019 | Kim | H04B 7/0452 |

FOREIGN PATENT DOCUMENTS

| | | |
|---|---|---|
| CN | 101588199 A | 11/2009 |
| CN | 101606338 A | 12/2009 |
| CN | 101754232 A | 6/2010 |
| CN | 101790224 A | 7/2010 |
| CN | 102474381 A | 5/2012 |
| CN | 103516497 A | 1/2014 |
| CN | 103716273 A | 4/2014 |
| EP | 2892192 A1 | 7/2015 |
| JP | 2014531856 A | 11/2014 |
| WO | WO-2013066125 A1 | 5/2013 |
| WO | WO-2015094914 A1 | 6/2015 |

OTHER PUBLICATIONS

Samsung, "Control Signaling Location in Presence of Data in EUTRA UL," 3GPP TSG RAN WG1 Meeting #50, R1-073572, Athens, Greece, Aug. 20-24, 2007, 4 pgs., XP050107175, 3rd Generation Partnership Project.

Huawei., et al., "Short TTI for DL Transmissions", R1-160292, 3GPP TSG RAN WG1 Meeting #84, St Julian's, Malta, Feb. 15-19, 2016, Feb. 6, 2016, 7 pages, URL:http://www.3gpp.org/ftp/tsg_ran/WG1_RL1/TSGR1_84/Docs/R1-160292.zip (in particular, refer to section 2).

* cited by examiner

WIRELESS RESOURCE BLOCKS WITH INTEGRATED CONTROL AND DATA

CROSS REFERENCES

The present Application for Patent claims priority to U.S. Provisional Patent Application No. 62/258,968 by ANG, et al., entitled "WIRELESS RESOURCE BLOCKS WITH INTEGRATED CONTROL AND DATA," filed Nov. 23, 2015 and to U.S.

Provisional Patent Application No. 62/267,180 by ANG, et al., entitled, "WIRELESS RESOURCE BLOCKS WITH INTEGRATED CONTROL AND DATA", filed Dec. 14, 2015, assigned to the assignee hereof, and each of which is expressly incorporated by reference herein.

INTRODUCTION

The following relates generally to wireless communication, and more specifically to transmission of integrated control and data within resource blocks (RBs) in a wireless transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

In some deployments, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In some deployments (e.g., in a next generation or 5G network), a wireless multiple access communication system may include a number of smart radio heads (radio heads) in communication with a number of access node controllers (ANCs), where a set of one or more radio heads, in communication with an ANC, defines an eNB. A base station or radio head may communicate with a set of UEs on downlink (DL) channels (e.g., for transmissions from a base station or radio head to a UE) and uplink (UL) channels (e.g., for transmissions from a UE to a base station or radio head).

In some cases, a base station may transmit control information to a UE to provide information related to various transmission parameters that the UE may use to receive, demodulate, and decode transmissions. Control information may contribute to overhead in wireless communication system operation, and thus efficient techniques for conveying such control information may enhance operation of wireless communication systems.

SUMMARY

A method of wireless communication is described. The method may include identifying a resource allocation including a resource block (RB) for transmission of data to a receiver; identifying control information to be included in the RB, the control information including one or more parameters for use by the receiver in demodulating the RB included in the resource allocation; and multiplexing the control information with the data within the RB included in the resource allocation.

An apparatus for wireless communication is described. The apparatus may include means for identifying a resource allocation including a resource block (RB) for transmission of data to a receiver; means for identifying control information to be included in the RB, the control information including one or more parameters for use by the receiver in demodulating the RB included in the resource allocation; and means for multiplexing the control information with the data within the RB included in the resource allocation.

A further apparatus is described. The apparatus may include a processor, memory in electronic communication with the processor, and instructions stored in the memory. The instruction may be operable, when executed by the processor, to cause the apparatus to identify a resource allocation including a resource block (RB) for transmission of data to a receiver; identify control information to be included in the RB, the control information including one or more parameters for use by the receiver in demodulating the RB included in the resource allocation; and multiplex the control information with the data within the RB included in the resource allocation.

A non-transitory computer-readable medium storing code for wireless communication is described. The non-transitory computer-readable medium may include code including instructions executable to identify a resource allocation including a resource block (RB) for transmission of data to a receiver; identify control information to be included in the RB, the control information including one or more parameters for use by the receiver in demodulating the RB included in the resource allocation; and multiplex the control information with the data within the RB included in the resource allocation.

Some examples of the method, apparatus, or non-transitory computer-readable medium described above may further include processes, features, means, or instructions for formatting the control information into one or more control resource elements (REs); formatting the data into a plurality data REs; and multiplexing the one or more control REs with the plurality of data REs In some examples of the method, apparatuses, or non-transitory computer-readable medium, the multiplexing may include frequency division multiplexing (FDM) of one or more control REs with one or more data REs within one or more symbols of the resource allocation including the RB. In some examples, the multiplexing may include frequency division multiplexing (FDM) of one or more control resource elements (REs) with one or more data REs within one or more symbols of the resource allocation including the RB, time division multiplexing (TDM) of one or more control REs with one or more data REs within one or more symbols of the resource allocation including the RB, and a combination of FDM and TDM of one or more control REs with one or more data REs within one or more symbols of the resource allocation including the RB, or a combination thereof. In some examples, one or more control RE is included in each symbol of the resource allocation including RB. Additionally or alternatively, one or more control RE is included in a first subset of symbols of the resource allocation including the RB, and symbols of the first subset of symbols of the resource allocation including the RB are time division multiplexed (TDM) with one or more symbols of the resource allocation including the RB that do not contain control information. Additionally or alternatively, one or more control RE is included in a second subset of symbols of the resource allocation including the RB, and symbols of the second subset of symbols of the resource allocation including the RB are frequency division multiplexed (FDM) with one or more symbols of the resource allocation including the RB that do not contain control information. In some examples, the multiplexing may include TDM, the control information may be included in one or more control symbols of the resource allocation including the RB, and the one or more control symbols of the resource allocation including the RB may be transmitted before, within, or after transmission of one or more data symbols within the resource allocation including the RB. In some examples, a first portion of the control information may be transmitted in a first control symbol of the resource allocation including the RB that is transmitted before transmission of one or more data symbols within the resource allocation including the RB, and a second portion of the control information may be transmitted in a second control symbol of the resource allocation including the RB that is transmitted after transmission of the one or more data symbols within the resource allocation including the RB. In some examples, the first portion of the control information may include the one or more parameters for use by the receiver in demodulating the resource allocation including the RB and the second portion of the control information may include one or more of a scheduling parameter, an uplink grant for a subsequent transmission time interval, or a data acknowledgment.

In some examples of the method, apparatuses, or non-transitory computer-readable medium, the control information further may include one or more of a modulation and coding scheme (MCS) indication, a redundancy version (RV) indication, a new data indicator (NDI), a number of transmission layers, a scheduling parameter or a data acknowledgment. In some examples, the control information may include control information for two or more RBs within a transport block (TB), and in some examples the control information may include control information for all RBs within the TB. In some examples, the resource allocation may include multiple RBs. In some examples, each of multiple RBs may include at least a portion of the control information.

Some examples of the method, apparatus, or non-transitory computer-readable medium described above may further include processes, features, means, or instructions for signaling a location of the control information within the resource allocation including the RB. In some examples, the signaling may include one or more of a transmission time interval (TTI)-level common control signal, a mapping in a downlink assignment, an indication in radio resource control (RRC) signaling, or an indication in a demodulation reference signal (DMRS). In some examples, the control information may be for a plurality of receivers in a multi-user multiple-input-multiple-output (MU-MIMO) system. In some examples, the control information may be modulated according to a fixed modulation scheme.

Some examples of the method, apparatus, or non-transitory computer-readable medium described above may further include processes, features, means, or instructions for transmitting an indication of a modulation and coding scheme (MCS) applied to the control information. In some examples, the MCS applied to the control information may be different than an MCS applied to the data to be transmitted to the receiver.

A method of wireless communication is described. The method may include receiving a wireless transmission including a resource allocation including a resource block (RB) having control information and data; demultiplexing the control information and the data transmitted in the RB included in the resource allocation; demodulating the control information, the control information including one or more parameters for use in demodulating the data; and demodulating the data based at least in part on the one or more parameters.

An apparatus for wireless communication is described. The apparatus may include means for receiving a wireless transmission including a resource allocation including a resource block (RB) having control information and data; means for demultiplexing the control information and the data transmitted in the RB included in the resource allocation; means for demodulating the control information, the control information including one or more parameters for use in demodulating the data; and means for demodulating the data based at least in part on the one or more parameters.

A further apparatus is described. The apparatus may include a processor, memory in electronic communication with the processor, and instructions stored in the memory. The instruction may be operable, when executed by the processor, to cause the apparatus to receive a wireless transmission including a resource allocation including a resource block (RB) having control information and data; demultiplex the control information and the data transmitted in the RB included in the resource allocation; demodulate the control information, the control information including one or more parameters for use in demodulating the data; and demodulate the data based at least in part on the one or more parameters.

A non-transitory computer-readable medium storing code for wireless communication is described. The non-transitory computer-readable medium may include code including instructions executable to receive a wireless transmission including a resource allocation including a resource block (RB) having control information and data; demultiplex the control information and the data transmitted in the RB included in the resource allocation; demodulate the control information, the control information including one or more parameters for use in demodulating the data; and demodulate the data based at least in part on the one or more parameters.

In some examples of the method, apparatuses, or non-transitory computer-readable medium, the demultiplexing may include demultiplexing one or more control REs containing the control information and one or more data REs containing the data. In some examples, the demultiplexing may include demultiplexing one or more control REs containing the control information and one or more data REs containing the data. The control REs and the data REs, in some examples, may be multiplexed by time division multiplexing (TDM), FDM, or combinations thereof. In some examples, the control information further may include one or more of a modulation and coding scheme (MCS) indication, a redundancy version (RV) indication, a new data indicator (NDI), a number of transmission layers, a scheduling parameter or a data acknowledgment. In some examples, the control information may include control information for two or more RBs within a transport block (TB). In some examples, the control information may include control information for all RBs within the TB. In some examples, the control information may include control information for a TB. In some examples, the control information may include control information for a TB. In some examples, the control information may include control information for subsequent transmission time intervals (TTIs).

Some examples of the method, apparatus, or non-transitory computer-readable medium described above may further include processes, features, means, or instructions for receiving signaling indicating a location of the control information within the resource allocation including the RB. The signaling may include, in some examples, one or more of a TTI-level common control signal, a mapping in a downlink assignment included in a downlink grant, radio resource control (RRC) signaling, or demodulation reference signal (DMRS) based signaling.

In some examples, the signaling may further include a location of other control information for one or more multi-user multiple-input-multiple-output (MU-MIMO) users, and method, apparatus, or non-transitory computer-readable medium described above may further include processes, features, means, or instructions for rate matching around the location of the other control information when demodulating the resource allocation including the RB. In some examples, the signaling may further include an indication of a modulation and coding scheme (MCS) applied to the control information. In some examples, the MCS applied to the control information may be different than a MCS applied to the data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
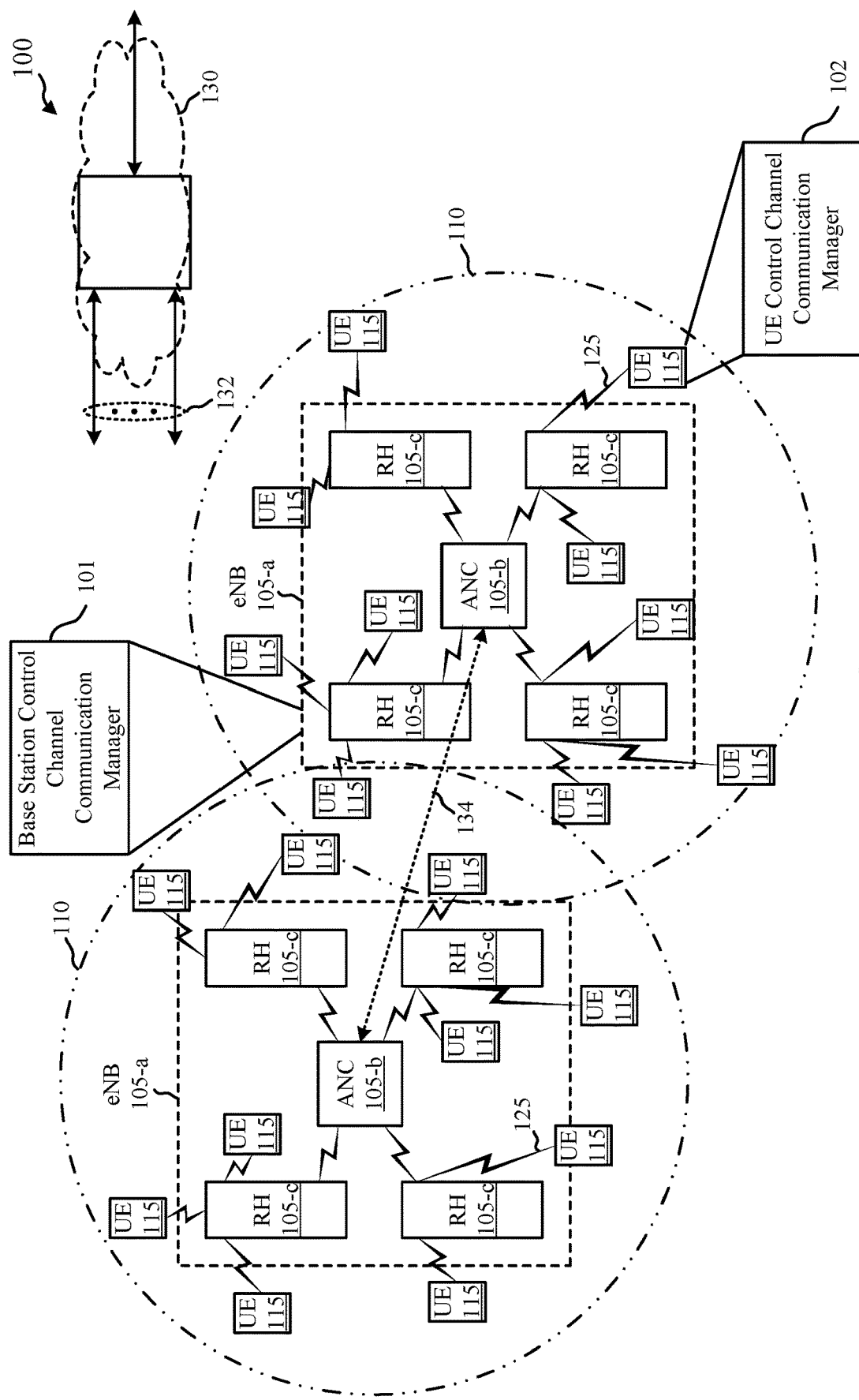
FIG. 1 illustrates an example of a wireless communications system that supports integrated control and data within RBs in accordance with one or more aspects of the present disclosure.

Various techniques described herein provide for transmission of control information that is embedded within a DL RB transmission to a UE. In some examples, common control information may be provided in a first transmission time interval (TTI)-level control region, and UE-specific control information, specific to a particular UE, may be provided along with data in allocated downlink resources to the UE. In some examples, the common control information may be provided to a particular UE, in a slot. In some examples, a base station may identify a resource allocation including a RB for transmission of data to a UE along with UE-specific control information to be included in the resource allocation including the RB. The UE-specific control information may include, for example, parameters for use by the receiver in demodulating the resource allocation including the RB, a scheduling parameter, an uplink grant for a subsequent TTI (i.e., subsequent slots), a data acknowledgment, or combinations thereof. The common control information may include information related to the allocation of the RB and a location of the UE-specific control information. The base station may multiplex the control information with the data within the RB and transmit the RB and control information. In some examples, the base station may multiplex the control information with the data within the resource allocation including the RB and transmit the resource allocation including the RB and control information. The control information may be transmitted before transmission of data within the RB, in the middle of transmission of data within the RB, after transmission of data within the RB, or combinations thereof. In some examples, the resource allocation may be a frequency allocation containing one or more RBs for transmitting data to a receiver.

The UE may receive the common control information and determine that UE-specific control information is included with an RB transmission. In some examples, the UE-specific control information is included in the resource allocation including the RB. The UE may receive the RB, identify the control information within the RB, and demodulate and decode the control information. In some examples, the resource allocation may contain more than one RBs, In such examples, the control information may be included within the resource allocation (i.e., the control message can reside in just one RB, or reside in multiple RBs within the resource allocation). In some examples, the control information may include one or more parameters for use by the receiver in demodulating the entire resource allocation. In some examples, each resource allocation may have one set of demodulation related parameters. The control parameters from the UE-specific control information from the RB transmission may be used by the UE to demodulate and decode data transmitted in the RB. In some examples, the control parameters may be used by the UE to demodulate and decode data transmitted in the resource allocation including the RB. The UE-specific control information may be formatted into one or more control resource elements (REs), and the data may be formatted into a number of data REs. The control information and data may be multiplexed at the RE level through frequency division multiplexing (FDM), time division multiplexing (TDM), or combinations thereof. The control information, in some examples, may be multiplexed into the RB through TDM to provide the control information earlier in time within the RB than at least some of the data transmitted in the RB. In some examples, the control information may be multiplexed into the resource allocation including the RB through TDM. A scheduling parameter may include dynamic or semi-dynamic scheduling information such as, for example, semi persistent scheduling (SPS) configuration changes, or prescheduling information for a next TTI (e.g., a scheduled macro sleep in which a UE may be signaled that it does not need to monitor control for next one or N slots).

5G networks are being designed to support significantly greater bandwidth operations than LTE/LTE-A networks. Conventional techniques for multiplexing control information and data within a TTI (e.g., a slot or a subframe) may not be adequate for some 5G applications. Some of the techniques described in the present disclosure enable the multiplexing of control information and data using hybrid TDM-FDM techniques. The hybrid TDM-FDM techniques may be CRS-based, DMRS-based, or a combination thereof. The techniques may be used individually or in combination to provide, in some examples, more flexible user capacity scaling, support for bandwidth-limited devices, and/or other advantages.

Aspects of the disclosure are initially described in the context of a wireless communication system. Further examples are provided of integrated UE-specific control information transmitted within DL RBs to particular UEs. Aspects of the disclosure are further illustrated by and described with reference to apparatus diagrams, system diagrams, and flowcharts that relate to integrated control and data within RBs.

FIG. 1 illustrates an example of a wireless communication system 100, in accordance with one or more aspects of the disclosure. The wireless communication system 100 may include network access devices 105, UEs 115, and a core network 130. Wireless communication system 100 may support integrated control and data within RBs to improve efficiency for control information transmission.

The core network 130 may provide user authentication, access authorization, tracking, Internet Protocol (IP) connectivity, and other access, routing, or mobility functions. At least some of the network access devices 105 (e.g., eNodeBs (eNBs) 105-a or access node controllers (ANCs) 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may additionally or alternatively communicate with a number of UEs 115 through a number of smart radio heads (radio heads) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105—may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNBs, etc. The wireless communication system 100 may include radio heads 105-c (or base stations or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell may additionally or alternatively cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may additionally or alternatively include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-a, radio heads 105-c, base stations, access points, or other network access devices, including macro eNBs, small cell eNBs, relay base stations, and the like. A UE may additionally or alternatively be able to communicate directly with other UEs (e.g., using a peer-to-peer (P2P) protocol).

The communication links 125 shown in wireless communication system 100 may include UL channels from a UE 115 to a radio head 105-c, and/or DL channels, from a radio head 105-c to a UE 115. The downlink channels may additionally or alternatively be called forward link channels, while the uplink channels may additionally or alternatively be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques (e.g., as described with reference to FIGS. 3-8). In some examples, the control information transmitted during a TTI or slot of a downlink channel may be distributed between different control regions in a cascaded manner (e.g., between a common control region and one or more UE-specific control regions).

One or more of eNBs 105-a may include a base station control channel communication manager 101, which may provide common control and UE-specific control information. In some examples, the base station control channel communication manager 101 may identify a resource allocation including a RB for transmission of data to a UE 115 and identify control information to be included in the RB. In some examples, the control information may be included in the resource allocation including the RB. In some examples, the resource allocation may be a frequency allocation containing one or more RBs for transmitting data to a receiver. The control information may include, for example, one or more UE-specific parameters for use by the UE in demodulating the RB. The base station control channel communication manager 101 may then multiplex the control information with the data within the RB. UEs 115 may include a UE control channel communication manager 102, which may receive a wireless transmission including a RB having control information and data, demultiplex the control information and the data transmitted in the RB, and demodulate the control information. The UE control channel communication manager 102 may then demodulate the data based at least in part on the one or more parameters from the control information. Base station control channel communication manager 101 may be an example of control channel communication manager 1305 described with reference to FIG. 13. UE control channel communication manager 102 may be an example of control channel communication manager 1205 described with reference to FIG. 12

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the radio heads 105-c and/or UEs 115 may include multiple antennas for employing antenna diversity schemes to improve communication quality and reliability between radio heads 105-c and UEs 115. Additionally or alternatively, radio heads 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may additionally or alternatively be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
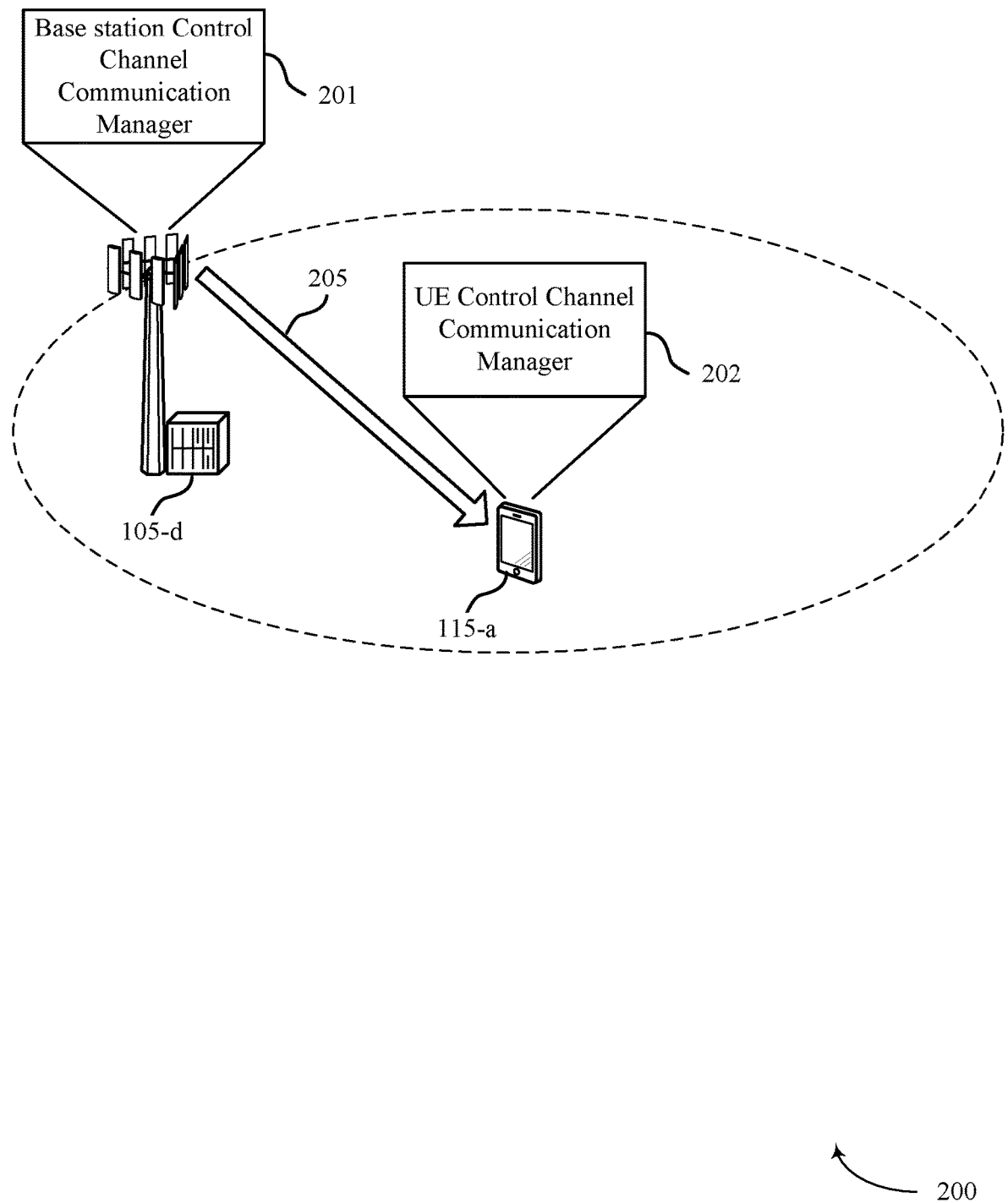
FIG. 2 illustrates an example of a wireless communications system that supports integrated control and data within RBs in accordance with one or more aspects of the present disclosure.

FIG. 2 illustrates an example of a wireless communications system 200 for integrated control and data within RBs in accordance with one or more aspects of the present disclosure. Wireless communications system 200 may include base station 105-d and UE 115-a, which may be examples of the corresponding devices described with reference to FIG. 1. Base station 105-d and UE 115-a may communicate over wireless link 205. Wireless communications system 200 may support integrated control and data within RBs to improve communication of control information.

Base station 105-d and UE 115-a may include base station control channel communication manager 201 and UE control channel communication manager 202, respectively. Base station control channel communication manager 201 may identify a resource allocation including a RB for transmission of data to UE 115-a and identify control information to be included in the RB. The control information may include, for example, one or more UE-specific parameters for use by the UE 115-a in demodulating the resource allocation including the RB. The base station control channel communication manager 201 may then multiplex the control information with the data within the RB. In some examples, the resource allocation may be a frequency allocation containing one or more RBs for transmitting data to a receiver.

UE control channel communication manager 202 may receive the wireless transmission including the resource allocation including the RB, the RB having control information and data, demultiplex the control information and the data transmitted in the RB, and demodulate the control information. The UE control channel communication manager 202 may then demodulate the data based at least in part on the one or more parameters from the control information. Base station control channel communication manager 201 or UE control channel communication manager 202 may be an example of control channel communication manager 910 described with reference to FIG. 9.

In wireless communications system 200, base station 105-a may multiplex control and data within allocated RBs for the UE 115-a. The multiplexing may be at the RE level, in some examples, which may provide for efficient extraction of control REs from the received transmissions, which may be processed ahead of data REs. In some examples, the control REs that are transmitted within an RB to UE 115-a. In some examples, the control REs are transmitted within a resource allocation including the RB. The control REs of a RB that contain UE-specific control information may be referred to herein as a Physical Downlink Data Indicator Channel (PDDICH). In some examples, a PDDICH location within an RB may be provided in a fixed location within an RB, and UE 115-a may need to search for the PDDICH over aggregation levels. In some examples, the PDDICH location within a resource allocation including a RB may be provided in a fixed location within the resource allocation including the RB. Such a relatively narrow search space may enhance UE 115-a operation through less resources having to be spent in searching for the control information. In some examples, the search space for the UE-specific control information may be indicated in common control information, radio resource control (RRC) signaling, or through persistent or semi-persistent scheduling. In some examples, a mapping of UE-specific control information locations and multiplexing may be mapped to one or more parameters of the common control information (e.g., control REs within an RB may be mapped to a DMRS port).

Furthermore, such techniques may provide for, in some examples, control information and data that are localized in the same RB, which may be favorable for bandwidth adaptation, and provide lower pilot overhead. Additionally, such embedded control may provide enhanced flexibility in trading off resources between control and data, localized to the UE 115-a, based at least in part on particular conditions at a given time. In some examples, the control information may additionally or alternatively carry data-related parameters, and the RB allocated to the UE 115-a may be relatively self-contained for data demodulation and decoding. Such features may provide, for example, enhanced interference cancellation when receiving the allocated RB.

Figure 3:
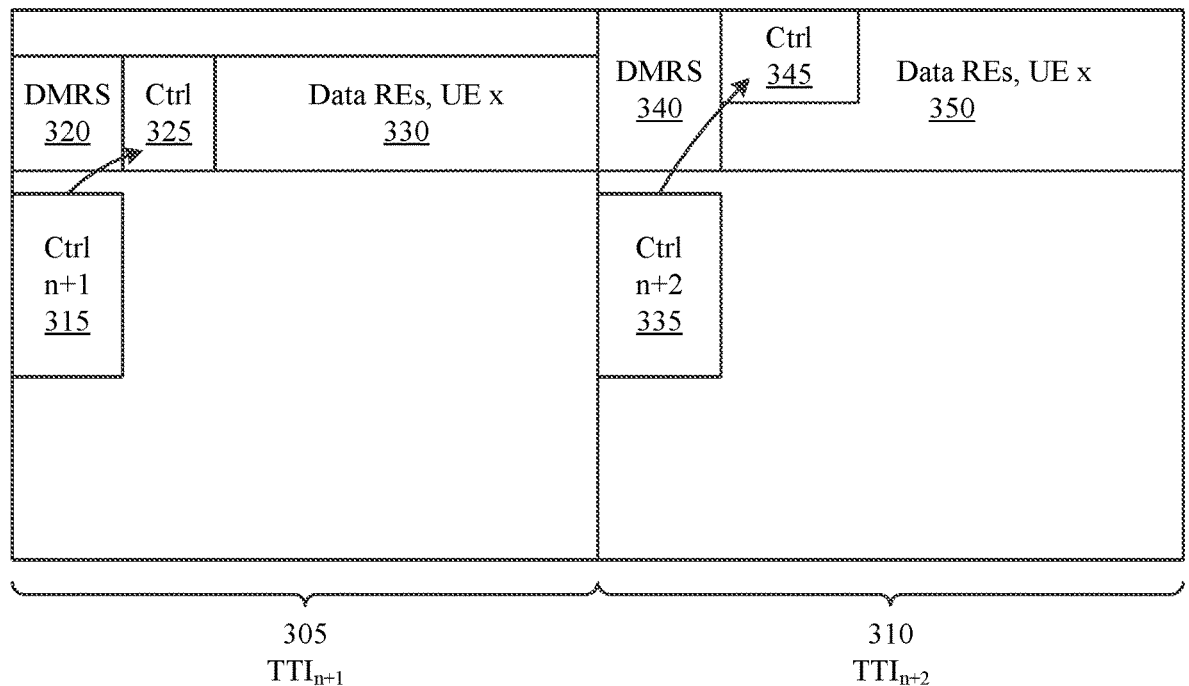
FIG. 3 illustrates an example of control channel configurations that support integrated control and data within RBs in accordance with one or more aspects of the present disclosure.

FIG. 3 illustrates an example 300 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2.

A base station (e.g., a base station 105 of FIGS. 1-2) in communication with a UE (e.g., a base station 105 of FIGS. 1-2) may transmit according to consecutive TTIs, such as $TTI_{n+1}$ 305 and $TTI_{n+2}$ 310. In the example of FIG. 3, a base station may transmit, during $TTI_{n+1}$ 305 common control information (ctrl n+1) 315, which may provide an indication for the UE-specific control information (ctrl) 325. UE-specific control information 325 may be transmitted in a RB with respect to a DMRS 320, which is a UE-specific reference signal transmitted using the same transmission parameters (e.g., number of layers, precoding, etc.) as data transmissions for the UE. In some examples, UE-specific control information 325 may be transmitted in a resource allocation including the RB. In this example, UE-specific control information 325 may be time division multiplexed with portions of the RB containing data REs for the UE (UE x) 330. In some examples, UE-specific control information 325 may be time division multiplexed with portions of the resource allocation including the RB containing data REs for the UE (UE x) 330. In examples such as this, the UE-specific control information 325 may occupy one or more entire symbols in the allocated RB. Together, DMRS 320, UE-specific control information 325, and data REs 330, may form a RB transmitted to the UE. The demodulation of the UE-specific control information 325 and data REs 330 may be based on the DMRS 320. It should be noted that the location and placement of DMRS 320 is for illustration purpose only and other options, such as having additional DMRS symbols within the RB, having DMRS symbols in symbols other than the first symbol, or sparser pattern of DMRS for each symbol, can be supported without deviating from the core ideas covered in this disclosure.

During the subsequent TTI, namely $TTI_{n+2}$ 310, the base station may transmit, common control information (ctrl n+2) 335, which may provide an indication for the UE-specific control information (ctrl) 345. UE-specific control information 345, again, may be transmitted in a RB following a transmission of DMRS 340. In some examples, UE-specific control information 345, may be transmitted in a resource allocation including a RB following a transmission of DMRS 340. In this example, UE-specific control information 345 may be time division multiplexed and frequency division multiplexed with portions of the RB containing data REs for the UE (UE x) 350. More specifically, not all number of the tones in the allocated RB are occupied by the UE-specific control information in the first one or more symbols. Together, DMRS 340, UE-specific control information 345, and data REs 350, may form a second RB transmitted to the UE. In some examples, the data REs 330 of $TTI_{n+1}$ 305 and the data REs 350 of $TTI_{n+2}$ 310 may be transmitted in multiple RBs according to the control information provided in respective UE-specific control information 325 and UE-specific control information 345. In some examples, an ordering scheme may be used to place control REs across frequency first (e.g., according to a data RB interleaving pattern) followed by time. Thus, if the number of allocated RBs are small, some examples may use TDM such as illustrated in $TTI_{n+1}$ 305, but if the allocated RBs are relatively large, both TDM and FDM may be used as illustrated in $TTI_{n+2}$ 310.

Figure 4A:
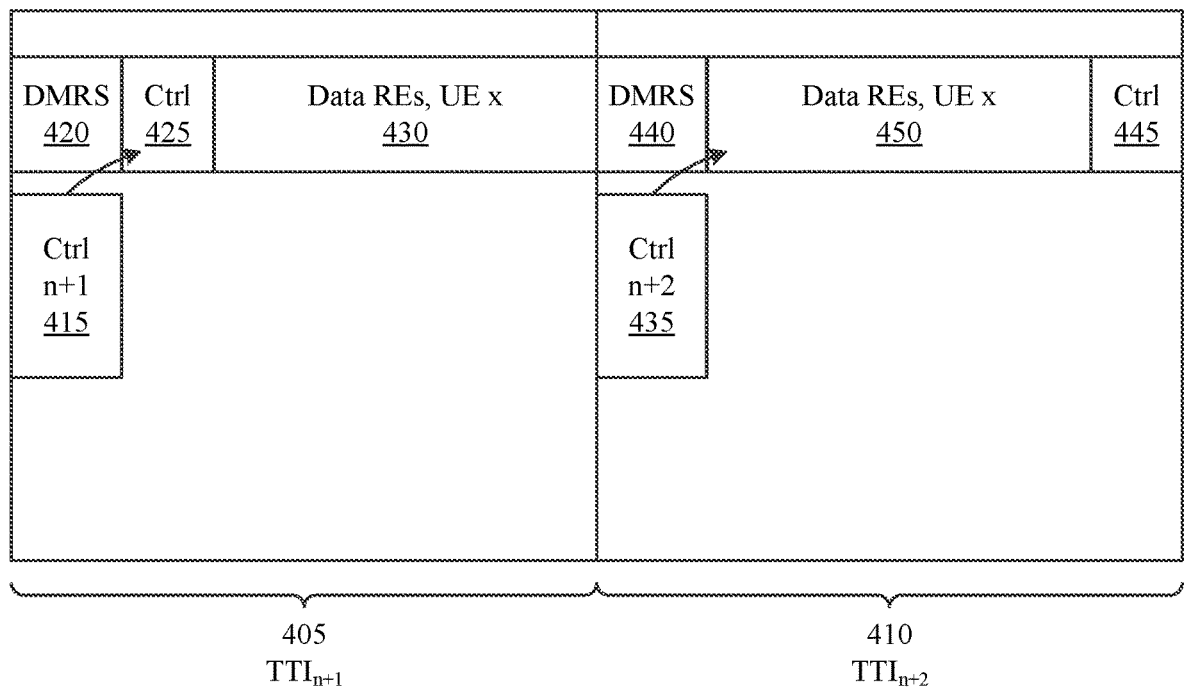
FIGS. 4A through 4B illustrate other examples of control channel configurations that support integrated control and data within RBs in accordance with one or more aspects of the present disclosure.

FIG. 4A illustrates an example 400 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2.

A base station (e.g., a base station 105 of FIGS. 1-2) in communication with a UE (e.g., a base station 105 of FIGS. 1-2) may transmit according to consecutive TTIs, such as $TTI_{n+1}$ 405 and $TTI_{n+2}$ 410. In the example of FIG. 4A, a base station may transmit, during $TTI_{n+1}$ 405 common control information (ctrl n+1) 415, which may provide an indication for the UE-specific control information (ctrl) 425. UE-specific control information 425 may be transmitted in a RB following a transmission of DMRS 420. In this example, UE-specific control information 425 may be time division multiplexed with portions of the RB containing data REs for the UE (UE x) 430. Together, DMRS 420, UE-specific control information 425, and data REs 430, may form a RB transmitted to the UE. In some examples, together, DMRS 420, UE-specific control information 425, and data REs 430, may form a resource allocation including the RB transmitted to the UE.

During the subsequent TTI, namely $TTI_{n+2}$ 410, the base station may transmit, common control information (ctrl n+2) 435, which may provide an indication for the UE-specific control information (ctrl) 445. UE-specific control information 445, in this example, may be transmitted in a RB following a transmission of both DMRS 440 and data REs 450 for the UE. In this example, UE-specific control information 445 again may be time division multiplexed with portions of the RB containing data REs for the UE (UE x) 450. Together, DMRS 440, UE-specific control information 445, and data REs 450, may form a second RB transmitted to the UE. In some examples, DMRS 440, UE-specific control information 445, and data REs 450, may form a resource allocation including a second RB transmitted to the UE.

Figure 4B:
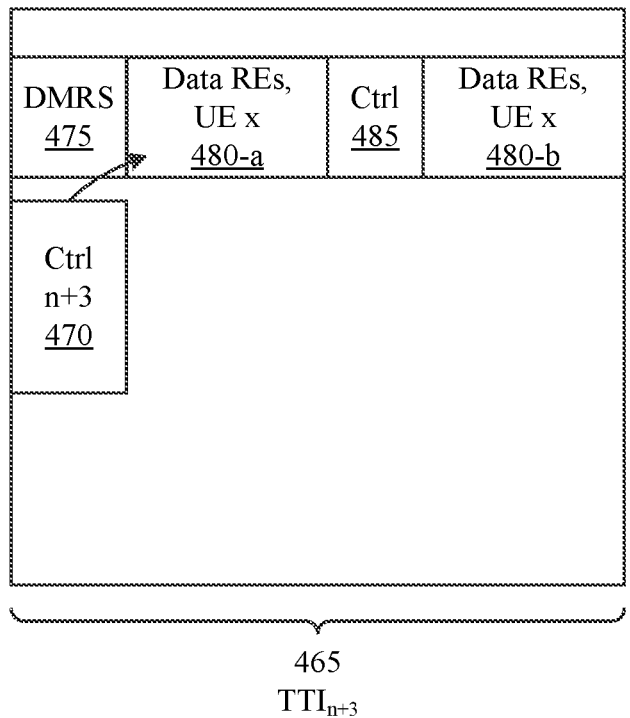

FIG. 4B illustrates another example 460 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2. In the example of FIG. 4B, a base station may transmit, during $TTI_{n+3}$ 465 common control information (ctrl n+3) 470, which may provide an indication for the UE-specific control information (ctrl) 485. UE-specific control information 485, in this example, may be transmitted in a one or more middle REs of a RB, following a transmission of DMRS 475 and a first portion of data REs 480-*a*, and before a transmission of a second portion of data REs 480-*b*. In this example, UE-specific control information 485 may be time division multiplexed with portions of the RB containing data REs for the UE (UE x) 480. Together, DMRS 475, UE-specific control information 485, and data REs 480, may form a RB transmitted to the UE. In some examples, DMRS 475, UE-specific control information 485, and data REs 480, may together form a resource allocation including the RB transmitted to the UE.

As illustrated in FIGS. 4A through 4B, for TDM (and for TDM and FDM combinations), there are options to place the UE-specific control information at early transmitted symbols within a TTI, late transmitted symbols within the TTI, middle symbols of the TTI, or combinations thereof. In some examples, UE-specific control information may be transmitted at one or more of early symbols, middle symbols, or late symbols. In some examples, as discussed above, the UE-specific control information may be demodulated and decoded, and used to assist in demodulation and decoding of data REs from the RB. In some examples, he UE-specific control information may be demodulated and decoded, and used to assist in demodulation and decoding of data REs from the resource allocation including the RB. In some examples, such as illustrated in FIG. 4A, front placement of at least a portion of the control information, such as illustrated in $TTI_{n+1}$ 405, to be used for demodulation and decoding may be beneficial for the processing timeline through reduced latency and reduced buffering delay for data processing.

Back placement of at least a portion of UE-specific control information, such as illustrated in FIG. 4A at $TTL_{n+2}$ 410, may be useful for non-time-critical control information, such as for signaling of semi-dynamic parameters (e.g., SPS configuration change), acknowledgment for UL data which was received in a previous TTI, or prescheduling information for a next TTI, to name a few. One example of prescheduling information for a next TTI is an indication of scheduled macro sleep in which a UE may be signaled that it does not need to monitor control for next one or N TTIs. Another example may be a bandwidth control indication to enable dynamic bandwidth adaptation, for which the UE may receive information about the frequency and bandwidth of the RB allocation in advance to prepare RF circuitry reconfiguration. Back-placement of at least a portion of UE-specific control information may additionally or alternatively provide additional time for a data processing pipeline at a UE to finish processing of data REs, and may allow completion of data processing during the reception of the back-placed UE-specific control information in some cases. Such a placement of UE-specific control information may be beneficial in situations where a UE is to provide an acknowledgment or negative acknowledgment of receipt of a transmission at the end of a particular TTI.

Middle placement of at least a portion of UE-specific control information, such as illustrated in FIG. 4B at $TTL_{n+3}$ 465, may be useful for non-time-critical control information that may additionally or alternatively benefit from additional "lead time" for processing prior to the end of the TTI. Some examples of non-time-critical control information are discussed above, some of which may be suitable for middle placement. For example, the control information 485 may include an uplink grant for a subsequent TTI, and the UE may benefit from additional processing time before the end of the TTI to prepare for an uplink transmission (e.g., processing of data for an acknowledgment or negative acknowledgment of a transmission).

In some examples, as mentioned above, combinations of different placements may be used in some TTIs. For example, early transmitted symbols, or REs within a symbol, may be used to provide UE-specific control information that may be used to assist in demodulation and decoding of data REs from the TTI, for example. Later transmitted symbols, or REs within a symbol, may be used to provide UE-specific control information that may include a scheduling parameter, an uplink grant for a subsequent TTI, or a data acknowledgment, for example. The later transmitted UE-specific control information may be transmitted in the middle of a TTI, at the end of a TTI, or combinations thereof.

Figure 5A:
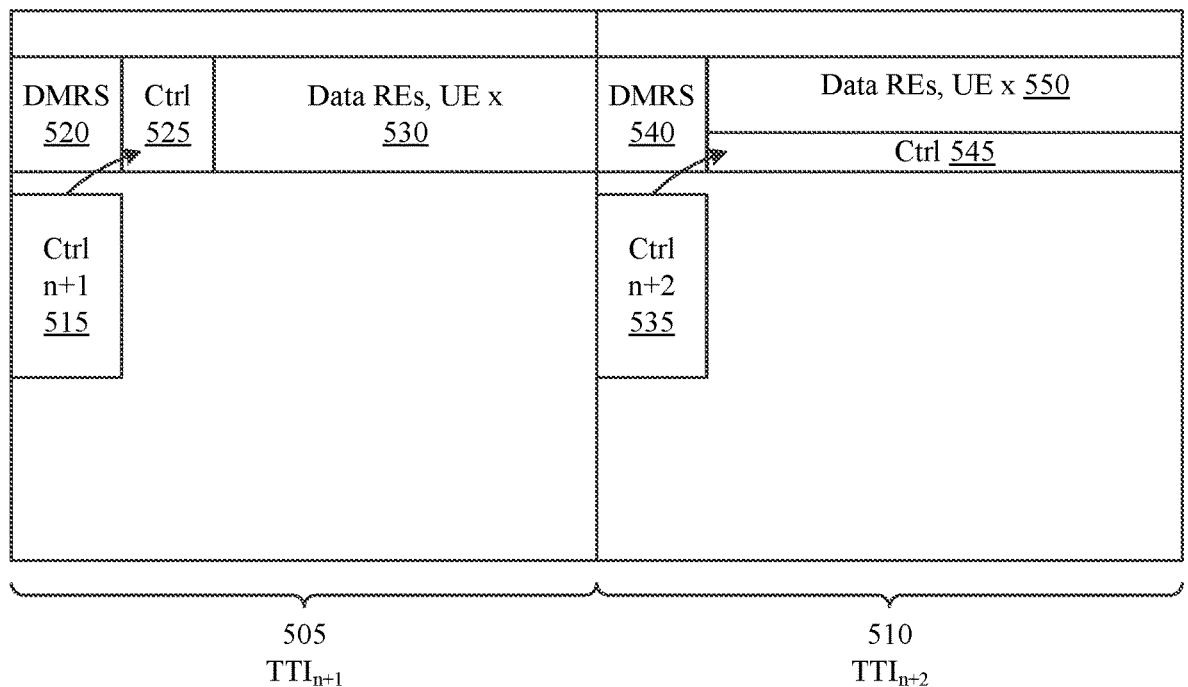
FIGS. 5A through 5B illustrate other examples of control channel configurations that support integrated control and data within RBs in accordance with one or more aspects of the present disclosure.

FIG. 5A illustrates an example 500 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2.

A base station (e.g., a base station 105 of FIGS. 1-2) in communication with a UE (e.g., a base station 105 of FIGS. 1-2) may transmit according to consecutive TTIs, such as $TTI_{n+1}$ 505 and $TTI_{n+2}$ 510. In the example of FIG. 5A, a base station may transmit, during $TTI_{n+1}$ 505 common control information (ctrl n+1) 515, which may provide an indication for the UE-specific control information (ctrl) 525. UE-specific control information 525 may be transmitted in a RB following a transmission of DMRS 520. In this example, UE-specific control information 525 may be time division multiplexed with portions of the RB containing data REs for the UE (UE x) 530. Together, DMRS 520, UE-specific control information 525, and data REs 530, may form a RB transmitted to the UE. In some examples, DMRS 520, UE-specific control information 525, and data REs 530, may together form a resource allocation including a RB transmitted to the UE.

During the subsequent TTI, namely $TTI_{n+2}$ 510, the base station may transmit, common control information (ctrl n+2) 535, which may provide an indication for the UE-specific control information (ctrl) 545. UE-specific control information 545, in this example, may be transmitted in a RB following a transmission of DMRS 540. In this example, UE-specific control information 545 may be frequency division multiplexed with portions of the RB containing data REs for the UE (UE x) 550. Together, DMRS 540, UE-specific control information 545, and data REs 550, may form a second RB transmitted to the UE.

As illustrated in FIG. 5A, TDM or FDM may be used for transmission of UE-specific control information. The particular multiplexing technique to use for a UE may depend on a number of factors. As discussed above, TDM may be useful for reducing latency and buffering, particularly when the UE-specific control information is placed at or near the beginning of a RB. Using FDM may result in UE-specific control information being more spread out over time, which may introduce latency in processing at the UE waits until all control symbols are received within an RB before processing the data symbols non-casually, which thus required additional buffering relative to a front-placed TDM of UE-specific control information. Using FDM may provide additional flexibility for changing a power used for control information REs if a link is power limited. A combination of FDM and TDM may allow a tradeoff, and more TDM-like multiplexing may be used if latency or buffering is desired to be kept relatively low, and more FDM-like multiplexing may be used if a link is more power limited.

Figure 5B:
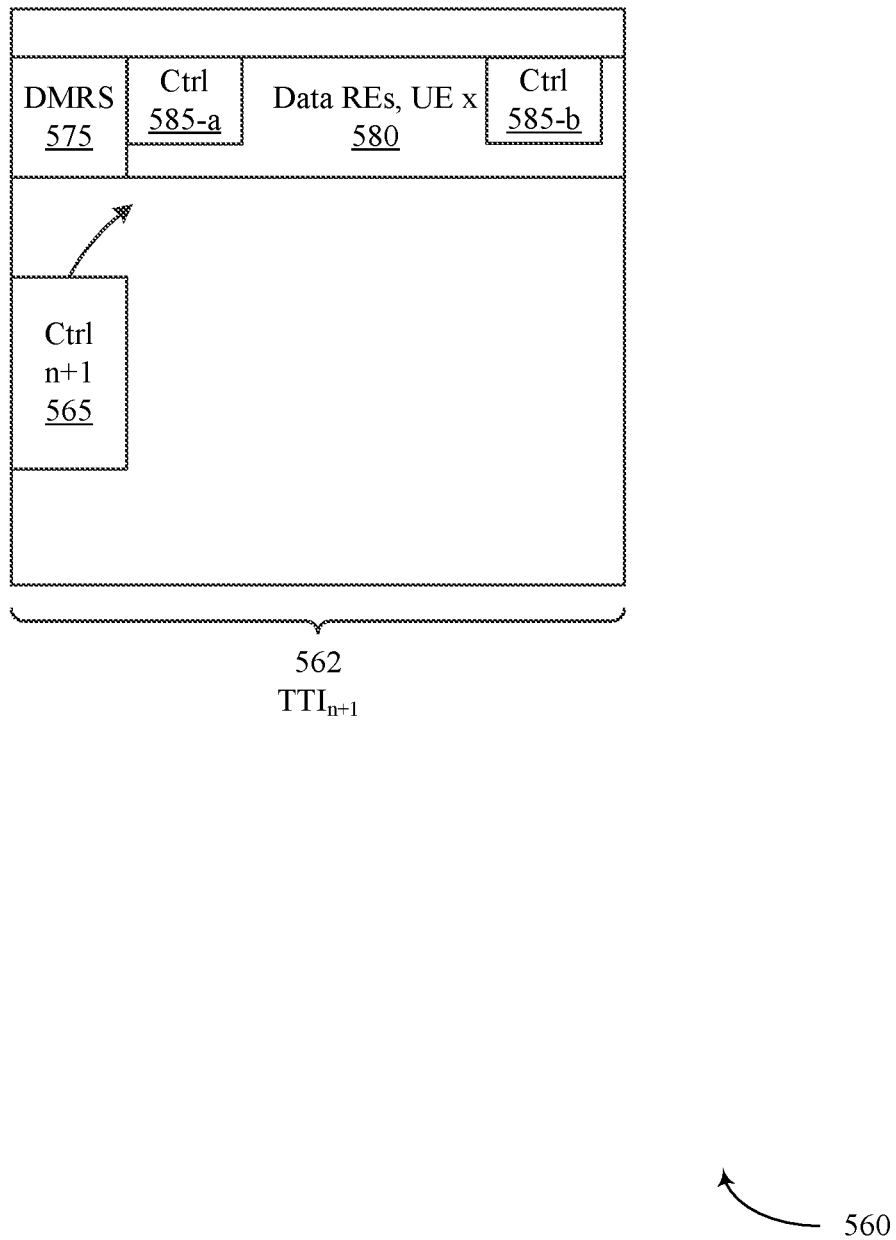

FIG. 5B illustrates an example 560 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2.

A base station (e.g., a base station 105 of FIGS. 1-2) in communication with a UE (e.g., a base station 105 of FIGS. 1-2) may transmit according to TTI, such as $TTI_{n+1}$ 562. In the example of FIG. 5B, a base station may transmit, during $TTI_{n+1}$ 562 common control information (ctrl n+1) 565, which may provide an indication for a first portion of the control information 585-*a* for the UE-specific control information (ctrl) 585 and a second portion of the control information 585-*b* for the UE-specific control information (ctrl) 585. The UE-specific control information 585 may be transmitted in multiple portions in a RB following a transmission of DMRS 575. In this example, the first portion of the control information 585-*a* and the second portion of the control information 585-*b* may be time division multiplexed with portions of the RB containing data REs for the UE (UE x) 580 and frequency division multiplexed with portions of the RB containing data REs for the UE (UE x) 580. In this example, the UE-specific control information 585 is scattered within the data REs for the UE (UE x) 580. Together, DMRS 575, the first portion of the control information 585-*a* for and the second portion of the control information 585-*b* of UE-specific control information 585, and data REs 580, may form a RB transmitted to the UE. In some examples, DMRS 575, the first portion of the control information 585-*a* for and the second portion of the control information 585-*b* of UE-specific control information 585, and data REs 580, may together form a resource allocation including the RB transmitted to the UE, where the scattering pattern can either be fixed and known to the UE, or indicated by common control information (ctrl n+1) 565. In some examples, DMRS 575, the first portion of the control information 585-*a* for and the second portion of the control information 585-*b* of UE-specific control information 585, and data REs 580, may form a resource allocation including a RB transmitted to the UE.

As illustrated in FIG. 5B, both TDM and FDM may be used for transmission of UE-specific control information. The particular multiplexing technique to use for a UE may depend on a number of factors. As discussed above, using TDM on portions of the UE-specific control information may be useful for reducing latency and buffering. Using FDM may result in portions of the UE-specific control information being more spread out over time, which may introduce latency in processing. However, using FDM may also provide additional flexibility for changing power used for control information. A combination of FDM and TDM may allow a tradeoff. The combination of FDM and TDM may allow the UE-specific control information to possess timing diversity as well as frequency diversity. As a result, the combination of FDM and TDM may lead to more reliable control performance of the UE-specific control information.

Figure 6:
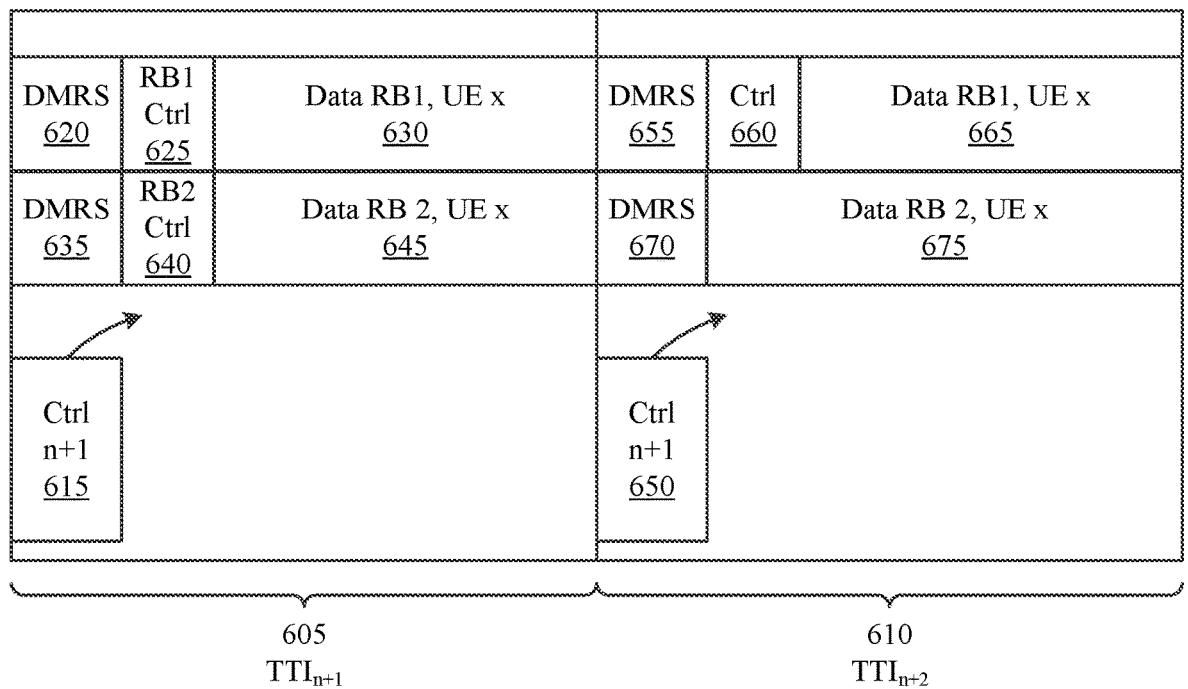
FIG. 6 illustrates another example of control channel configurations that support integrated control and data within RBs in accordance with one or more aspects of the present disclosure.

FIG. 6 illustrates an example 600 of multiplexing of control information and data within RBs in a system that supports integrated control and data within RBs in accordance with one or more aspects of the present disclosure. In some cases, control information location and multiplexing techniques may represent aspects of techniques performed by a UE 115 or base station 105 as described with reference to FIGS. 1-2. In this example, illustrations of UE-specific control information that may provide control information for a single RB or multiple RBs are discussed. In some examples, the UE-specific control information may provide control information for a resource allocation including a single RB or multiple RBs.

A base station (e.g., a base station 105 of FIGS. 1-2) in communication with a UE (e.g., a base station 105 of FIGS. 1-2) may transmit according to consecutive TTIs, such as $TTI_{n+1}$ 605 and $TTI_{n+2}$ 610. In the example of FIG. 6, a base station may transmit, during $TTI_{n+1}$ 605 common control information (ctrl n+1) 615, which may provide an indication for the UE-specific control information (RB1 ctrl) 625 for a first RB, as well as an indication for UE-specific control information (RB2 ctrl) 640 for a second RB. UE-specific control information 625 for the first RB may be transmitted in the first RB following a transmission of DMRS 620. UE-specific control information 640 for the second RB may be transmitted in the second RB following a transmission of DMRS 635. In this example, UE-specific control information 625 may be time division multiplexed with portions of the first RB containing data REs for the UE (UE x) 630, and UE-specific control information 640 may be time division multiplexed with portions of the second RB containing data REs for the UE (UE x) 645. Together, DMRS 620, UE-specific control information 625 for the first RB, and data REs 630 for the first RB, may form the first RB transmitted to the UE. Similarly, DMRS 635, UE-specific control information 640 for the second RB, and data REs 645 for the second RB, may form the second RB transmitted to the UE. In some examples, DMRS 620, UE-specific control information 625 for the first RB, and data REs 630 for the first RB, may together form a resource allocation including the first RB transmitted to the UE. Similarly, in some examples, DMRS 635, UE-specific control information 640 for the second RB, and data REs 645 for the second RB, may form a resource allocation including the second RB transmitted to the UE.

During the subsequent TTI, namely $TTI_{n+2}$ 610, the base station may transmit, common control information (ctrl n+2) 650, which may provide an indication for the UE-specific control information (ctrl) 660 for multiple RBs. UE-specific control information 660, in this example, may be transmitted in a first RB following a transmission of DMRS 655. In this example, UE-specific control information 660 may be time division multiplexed with portions of the first RB containing data REs for the UE (UE x) 665. Together, DMRS 655, UE-specific control information 660 for the first RB, and data REs 665 for the first RB, may form a first RB transmitted to the UE in $TTI_{n+2}$ 610. The UE-specific control information 660 may additionally or alternatively include control information for a second RB in $TTI_{n+2}$ 610 that is formed of DMRS 670 and data REs 675 for the second RB.

As illustrated in FIG. 6, UE-specific control information may be transmitted per RB within a TTI, or shared control may be provided for multiple RBs within one RB of a TTI. In some examples, a single UE-specific control information PDDICH per transport block (TB), or TTI, may be provided, as modulation and coding scheme (MCS), redundancy version (RV), and other parameters may be different per TB or TTI (assuming the TB is partitioned in frequency or time, but not transport layers). For a given TB or TTI, if it contains more than one RB transmitted to a UE, some examples may provide that each RB carries its own PDDICH, as illustrated for $TTI_{n+1}$ 605. In other examples, such as illustrated in $TTI_{n+2}$ 610, a group of RBs of a TTI or TB may be associated with one PDDICH (and a second group of RBs may be associated with a second PDDICH), or all RBs belonging to the TTI or TB may be associated with a single PDDICH. In some deployments, each RB having its own PDDICH may provide for enhanced data interference cancellation (IC) techniques. For example, for RBs that collide with transmissions of an adjacent base station, the interfering RB's control information (e.g., MCS, rank, etc.) could be decoded with lower complexity, without needing to know the neighboring base station's allocation. Such PDDICH per RB may result in relatively higher overhead due to repeat of control info in every RB. A single PDDICH per TB or TTI may provide the lowest overhead as no control information is repeated, and a PDDICH per group of RBs may allow tradeoff between IC and overhead.

Locating control information within an RB, locating control information within a resource allocation including the RB, or the search space for the control information, may be complicated due to the many multiplexing and control information placement schemes as described above with respect to FIGS. 3-6. Specifically, the starting location of the resources used for control information within an RB may be one of a number of different possibilities given the different combinations of multiplexing and locations of the control information. Furthermore, aggregation levels of the number of RBs to which the control information applies may add another dimension, additionally or alternatively adding the ending locations of resource used for control information. Additionally, downlink control information (DCI) length may add a further dimension. In order to provide a limited search space for a UE to locate control information, various examples may provide semi-static signaling, in which a UE is conveyed (e.g., via RRC signaling) information on the control information multiplexing scheme used, and the starting location of associated resources. The UE, based at least in part on this information, may perform a blind search over aggregation levels and lengths to identify the control information.

In other examples, dynamic signaling may be provided in which the UE is conveyed of the multiplexing scheme, aggregation level, DCI length, ending location, or combinations thereof via light-weight control in a CRS-based common control region (e.g., DL assignment). Such dynamic signaling may, in some examples, work in conjunction with semi-static signaling, which may provide some parameters that may be signaled in the dynamic signaling, and in some examples may provide a mapping between indications in the signaling and the control information. Furthermore, to reduce the search space in some examples, a DCI type designation may be provided, in which DCI for DL data and DCI for UL data can occupy different locations which are deterministic relative to each other (e.g., DCI for DL always placed before DCI for UL).

In some examples, multiple-user (MU)-MIMO operation may be supported, and control information may be provided to different UEs in a MU-MIMO system. In some examples, a resource used for control information may be the same for different UEs in MU-MIMO streams. In some examples, one or more different UEs may use different resource for control in a MU-MIMO group, and such UEs may be informed of the total resource used for control information of other UEs of the MU-MIMO group in order to rate-match around those resources for data processing. Such information may be provided, for example, in CRS-based common control or in user-specific RB-embedded control.

In some examples, a MCS of UE-specific control information transmitted in a RB may be different than a MCS of data REs of the RB. For example, the control information within the RB may have a fixed modulation such as quadrature phase shift keying (QPSK). In some examples, the modulation scheme may be signaled in CRS-based common control information (e.g., in a DL assignment) for a particular UE, which may provide additional flexibility for control information modulation schemes. For example, a modulation scheme may be mapped to one or more bits of the common control information. In further examples, a modulation scheme for the UE-specific control information may be embedded in a pilot or could be derived from PDSCH modulation order (e.g., PDSCH modulation order minus one, lower bounded by QPSK).

Additionally, the UE-specific control information may be coded separately from data transmitted in the RB. Such separation of control and data on the resource element level may provide for faster extraction of control REs from the RB transmission for processing. In some examples, separate coding of control and data REs may provide the control information that is not impacted by processing delay along with data in the processing pipeline. In some examples, control information RE decoding may be implemented in separate hardware (e.g., decoder output buffer may ship packets directly to L1 CPU), or different types of code may be used for control REs and data REs (e.g., tailbiting convolutional code (TBCC) or an algebraic code may be used for control REs, and low-density parity check (LDPC) or Turbo code may be used for data REs).

Figure 7:
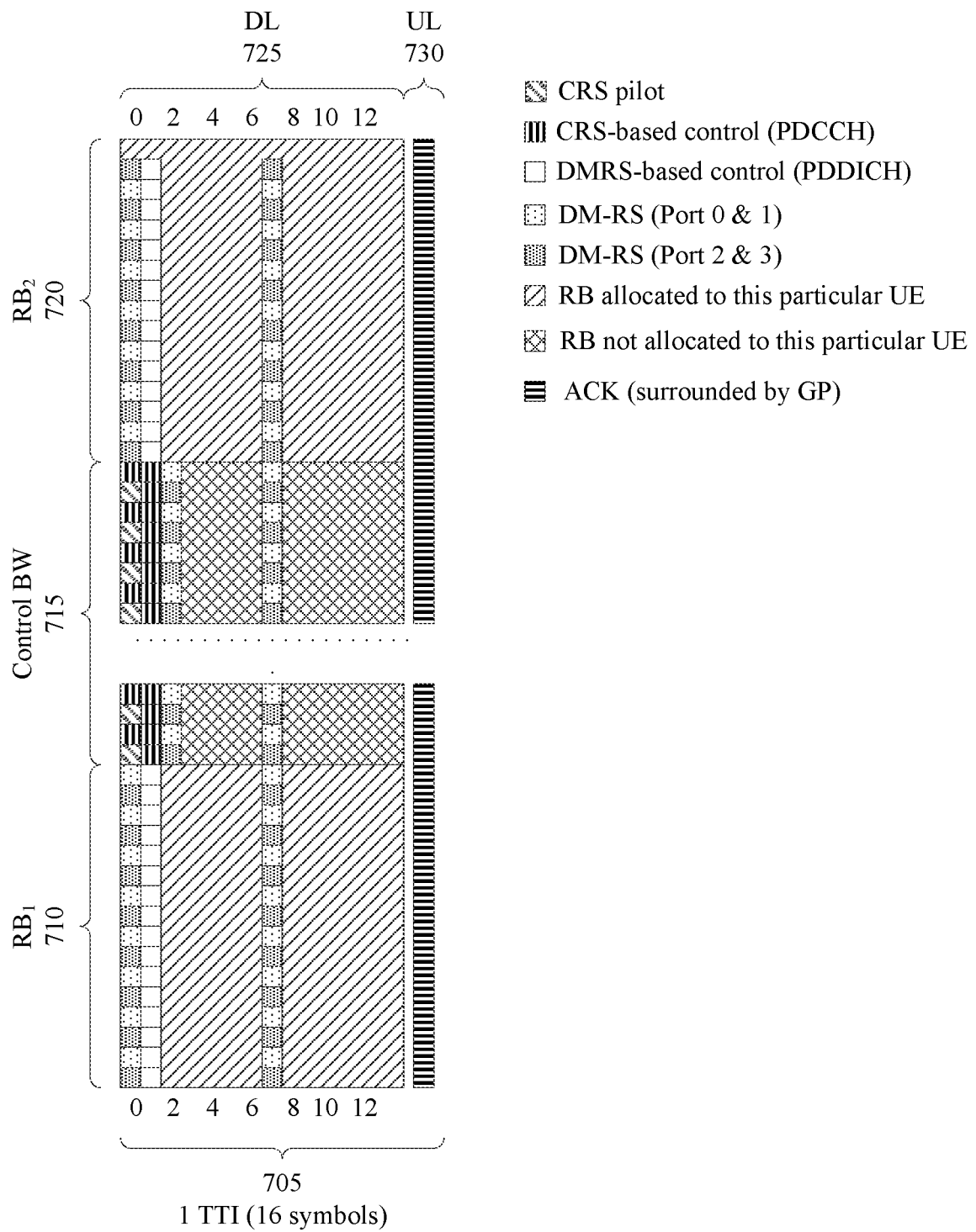
FIG. 7 illustrates an example of a resource configuration that supports integrated control and data within RBs in accordance with one or more aspects of the present disclosure.

FIG. 7 illustrates one specific example 700 of a resource configuration that supports integrated control and data within RBs in accordance with one or more aspects of the present disclosure. In some cases, the resource configuration of example 700 may represent aspects of techniques performed by a UE 115 or base station 105 as described with reference to FIGS. 1-2. In the example, of FIG. 7, a TTI 705 may contain 16 OFDM symbols which include downlink symbols 725 and an uplink symbol 730 which may be used to provide an acknowledgment of receipt of the downlink symbols 725. The uplink symbol 730 may be surrounded by a guard period (GP). In some examples, the RB may be included in a resource allocation.

In this example, a control bandwidth 715, a first RB, $RB_1$ 710, and a second RB, $RB_2$ 720 may include REs as illustrated in FIG. 7. The control bandwidth 715 may include REs for a CRS pilot and CRS-based common control information, REs for DMRS, and REs that are part of a RB that is not allocated for the particular UE. $RB_1$ 710 and $RB_2$ 720 may be allocated to the UE, and may include DMRS REs in a first symbol, followed by PDDICH REs in a second symbol. In this example, PDDICH REs are multiplexed according to TDM with data RBs allocated to the UE. As discussed above, various different multiplexing schemes may be used, and placement of the PDDICH REs may be selected to be in a later symbol of the DL symbols 725. In some examples, if two RBs are allocated to a UE, 32 tones may be used for PDDICH, and if one symbol used with TDM, it may corresponds to 1 CCE. In some examples, rather than having DMRS in the first symbol and PDDICH in the second symbol, the PDDICH and DMRS may be interleaved to occupy both the first and second symbols in alternating tones.

The PDDICH REs may include data demodulation specific control information, as discussed above. For example, the PDDICH REs may include information related to MCS, NDI, RV, or number of layers of the data REs. In some examples, the PDDICH REs may include an appended cyclic redundancy check (CRC) that may be masked with the UE's cell-radio network temporary identifier (C-RNTI). In one example, the PDDICH may be coded with a TBCC coding scheme with a rate ⅓, and may provide control information for various aggregation levels. Beamforming and transmit diversity schemes additionally or alternatively may be used for PDDICH REs.

Such a PDDICH as discussed herein may provide a number of benefits. For example, such techniques may reduce loading on CRS-based control and provide enhanced system scalability. A reduced search space may be provided, that is confined to allocated RBs for a UE. Such techniques may additionally or alternatively provide more flexible tradeoff between a UE's own data and control, and may allow for dynamic cancellation of prescheduled or semi-persistent scheduled RBs. Further, more self-contained control information may enable lower complexity data IC.

Figure 8:
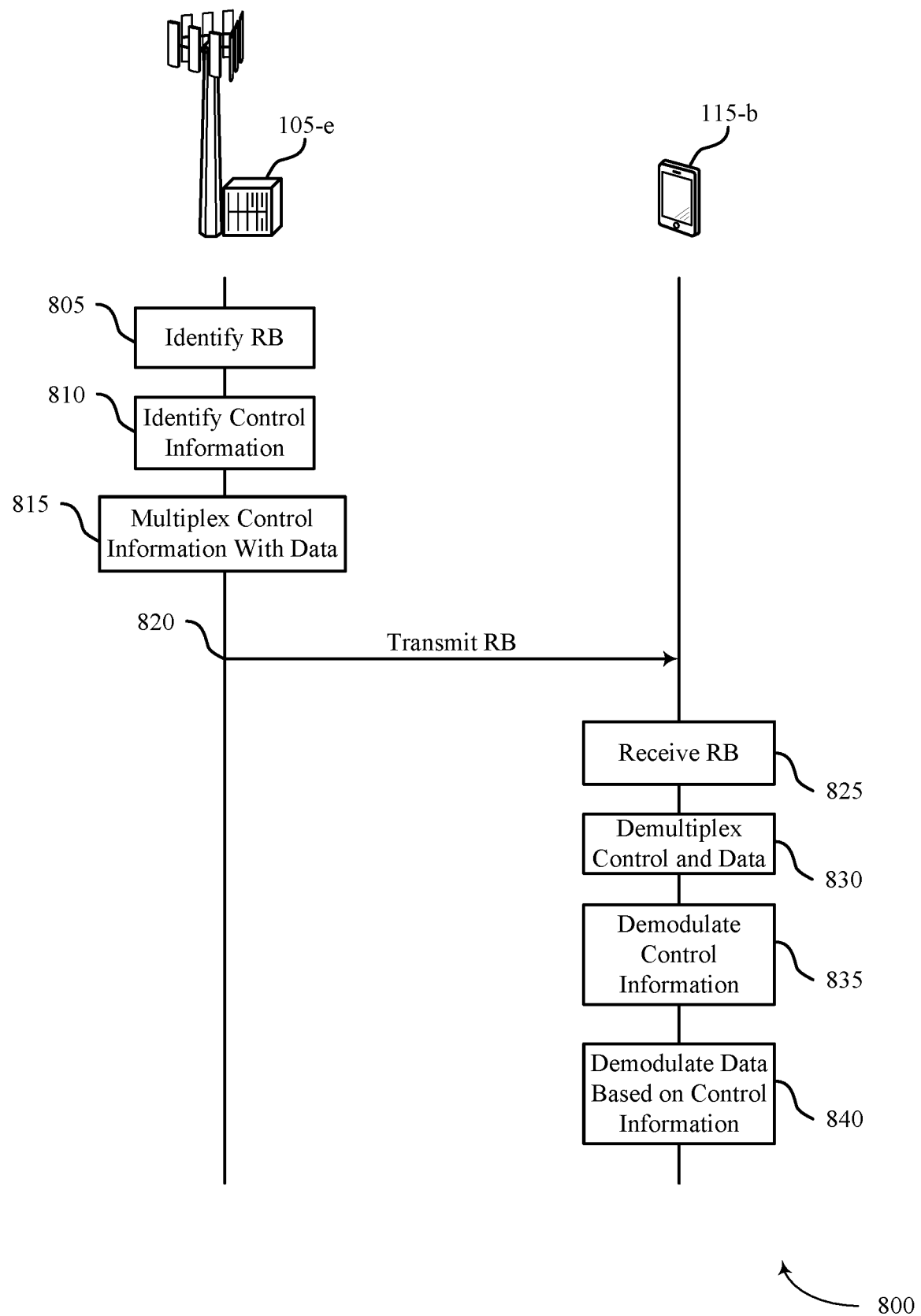
FIG. 8 illustrates an example of a process flow in a system that supports integrated control and data within RBs in accordance with one or more aspects of the present disclosure.

FIG. 8 illustrates an example of a process flow 800 for integrated control and data within RBs in accordance with one or more aspects of the present disclosure. Process flow 800 may include base station 105-e and UE 115-b, which may be examples of the corresponding devices described with reference to FIG. 1-2.

At block 805, base station 105-e may identify a resource allocation including a RB for transmission to UE 115-b. At block 810, base station 105-e may identify control information associated with the RB. In some examples, the RB may be included in the resource allocation. In some examples, the control information may be UE-specific control information that may include one or more parameters for use in demodulation and decoding data from the RB. The base station 105-e may format the control information into one or more control REs, and may format data to be transmitted in the RB into a plurality of data REs. In some examples, the resource allocation may contain more than one RBs, In such examples, the control information may be included within the resource allocation (i.e., the control message can reside in just one RB, or reside in multiple RBs within the resource allocation). In some examples, the control information may include one or more parameters for use by the receiver in demodulating the entire resource allocation. In some examples, each resource allocation may have one set of demodulation related parameters.

At block 815, base station 105-e may multiplex the control information with the data for the RB included in the resource allocation. Base station 105-e may, for example, multiplexing the control REs with the data REs. Such multiplexing may include FDM, TDM, or combinations thereof. In examples that use TDM, the placement of the control REs may be such that one or more control symbols of the RB are transmitted before transmission of one or more data symbols within the RB, or such that the one or more control symbols of the RB are transmitted after transmission of one or more data symbols within the RB. In other examples, the control information may be transmitted in two symbols, one of which may be transmitted before transmission of one or more data symbols and the other of which may be transmitted after transmission of the one or more data symbols within the RB. The first portion of the control information in such examples may include one or more parameters for use by the UE 115-b in demodulating the RB and the second portion of the control information may include one or more of a scheduling parameter or a data acknowledgment.

As discussed above, the control information may include one or more of a MCS indication, a RV indication, a new data indicator (NDI), a number of transmission layers, a scheduling parameter or a data acknowledgment. The control information may additionally or alternatively include control information for two or more RBs within a TB, depending upon an aggregation level that is selected for transmission of UE-specific control information. In some examples, the base station 105-*e* may signal a location of the control information within the RB, such as through one or more of a TTI-level common control signal, a mapping in a downlink assignment, an indication in RRC signaling, or an indication in a DMRS. In some examples an MCS applied to the control information may be different than a MCS applied to the data. For example, the control information may be modulated according to a fixed modulation scheme, or a modulation scheme that may be derived from a MCS applied to the data of the RB.

The base station 105-*e* may transmit the RB to the UE 115-*b* at 820. In some examples, the base station 105-*e* may transmit the resource allocation including the RB to the UE 115-*b*. At block 825, the UE 115-*b* may receive the RB. The UE 115-*b* may demultiplex the control and data in the RB as indicated at block 830. The demultiplexing may include demultiplexing one or more control REs containing the control information and one or more data REs containing the data, which may be multiplexed by TDM, FDM, or combinations thereof.

The UE 115-*b*, at block 835, may demodulate the control information. As discussed above, the control information may include UE-specific control information that may include one or more parameters for use in demodulating the data transmitted in the RB. For example, as discussed above, the UE-specific control information may include one or more of a MCS indication, a RV indication, a NDI, a number of transmission layers, a scheduling parameter or a data acknowledgment. At block 840, the UE 115-*b* may demodulate the data from the RB based at least in part on the one or more parameters from the UE-specific control information. In some examples, the control information may include control information for two or more RBs within a TB, and the UE 115-*b* may use the control information for demodulating and decoding each of the RBs to which the control information applied.

The UE 115-*b*, in some examples, may additionally or alternatively receive signaling indicating a location of the control information within the RB, such as via a TTI-level common control signal, a mapping in a downlink assignment included in a downlink grant, RRC signaling, or DMRS-based signaling. In some examples, the signaling may additionally or alternatively include a location of other control information for one or more MU-MIMO users, and the UE 115-*b* may rate match around the location of the other control information when demodulating the RB. In some examples, the signaling may additionally or alternatively include an indication of a MCS applied to the control information, which may be different than a MCS applied to the data.

Figure 9:
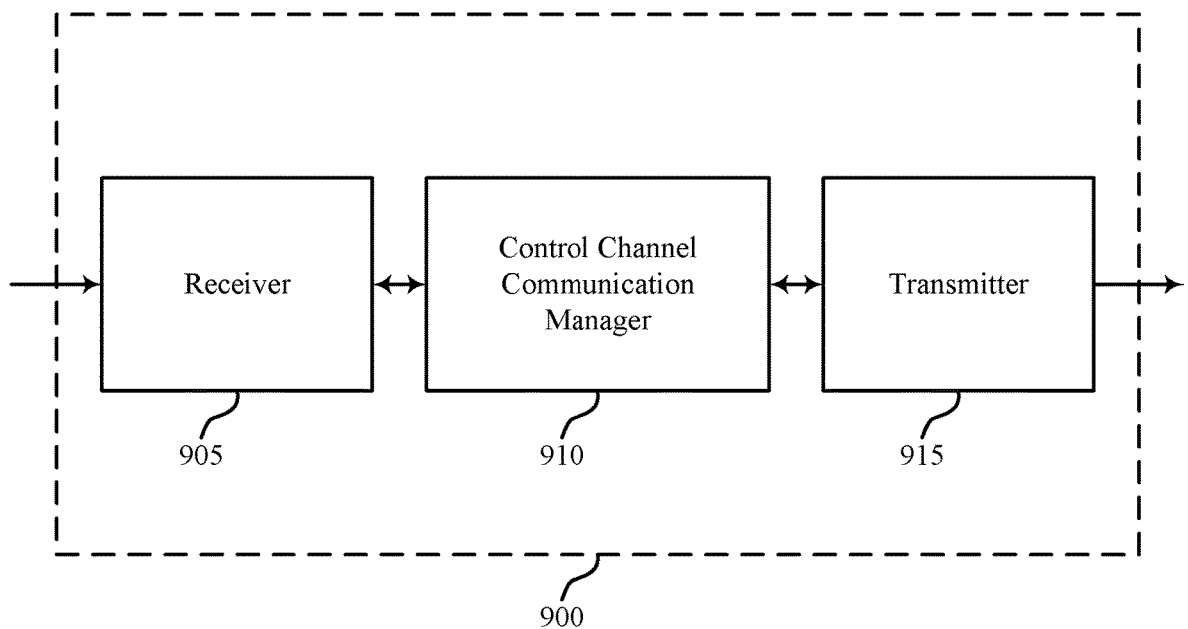
FIGS. 9 through 11 show block diagrams of a wireless device that supports integrated control and data within RBs in accordance with one or more aspects of the present disclosure.

FIG. 9 shows a block diagram of a wireless device 900 that supports integrated control and data within RBs in accordance with one or more aspects of the present disclosure. Wireless device 900 may be an example of aspects of a UE 115 or base station 105 described with reference to FIG. 1, 2, or 8. Wireless device 900 may include receiver 905, control channel communication manager 910 and transmitter 915. Wireless device 900 may additionally or alternatively include a processor. Each of these components may be in communication with each other.

The receiver 905 may receive information such as packets, user data, or control information associated with various information channels (e.g., control channels, data channels, and information related to integrated control and data within RBs, etc.). Information may be passed on to other components of the device. The receiver 905 may be an example of aspects of the transceiver 1225 or 1325 described with reference to FIGS. 12 and 13.

The control channel communication manager 910, when the wireless device is an example of a base station, may identify a RB for transmission of data to a receiver, identify control information to be included in the RB, and multiplex the control information with the data within the RB. In some examples, the resource allocation may contain more than one RBs, In such examples, the control information may be included within the resource allocation (i.e., the control message can reside in just one RB, or reside in multiple RBs within the resource allocation). The control information may include, for example, one or more parameters for use by the receiver in demodulating the RB. The control channel communication manager 910, when the wireless device is an example of a UE, may receive a wireless transmission including a resource allocation including a RB having control information and data, demultiplex the control information and the data transmitted in the RB included in the resource allocation, demodulate the control information, and demodulate the data based at least in part on the one or more parameters. In some examples, the control information may include one or more parameters for use by the receiver in demodulating the entire resource allocation. In some examples, each resource allocation may have one set of demodulation related parameters. The control channel communication manager 910 may additionally or alternatively be an example of aspects of the UE control channel communication manager 1205 or base station control channel communication manager 1305 described with reference to FIGS. 12 and 13.

The transmitter 915 may transmit signals received from other components of wireless device 900. In some examples, the transmitter 915 may be collocated with a receiver in a transceiver module. For example, the transmitter 915 may be an example of aspects of the transceiver 1225 or 1325 described with reference to FIGS. 12 and 13. The transmitter 915 may include a single antenna, or it may include a plurality of antennas.

Figure 10:
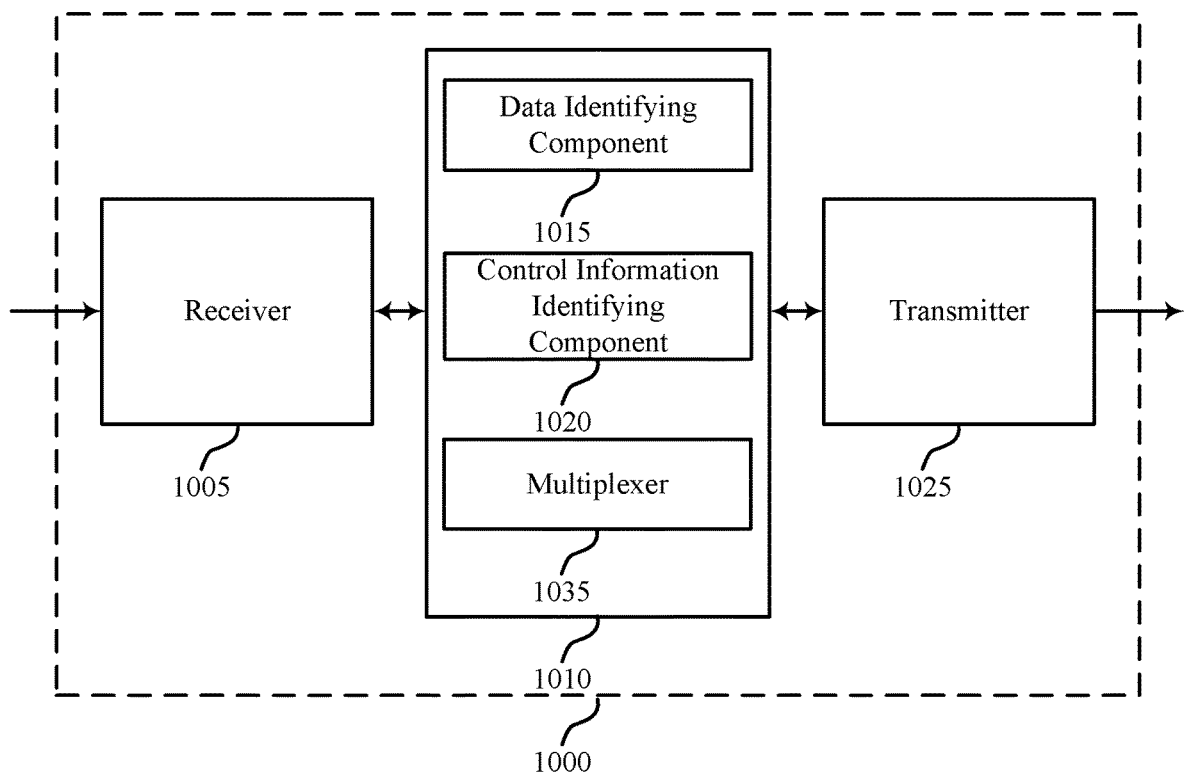

FIG. 10 shows a block diagram of a wireless device 1000 that supports integrated control and data within RBs in accordance with one or more aspects of the present disclosure. Wireless device 1000 may be an example of aspects of a wireless device 900 or a UE 115 or base station 105 described with reference to FIG. 1, 2, 8, or 9. Wireless device 1000 may include receiver 1005, control channel communication manager 1010 and transmitter 1025. Wireless device 1000 may additionally or alternatively include a processor. Each of these components may be in communication with each other.

The receiver 1005 may receive information which may be passed on to other components of the device. The receiver 1005 may additionally or alternatively perform the functions described with reference to the receiver 905 of FIG. 9. The receiver 1005 may be an example of aspects of the transceiver 1225 or 1325 described with reference to FIGS. 12 and 13.

The control channel communication manager 1010 may be an example of aspects of control channel communication manager 910 described with reference to FIG. 9. The control channel communication manager 1010 may include data identifying component 1015, control information identifying component 1020, and multiplexer 1035. The control channel communication manager 1010 may be an example of aspects of the UE control channel communication manager 1205 or base station control channel communication manager 1305 described with reference to FIGS. 12 and 13.

The data identifying component 1015, when wireless device 1000 is an example of a base station, may identify data to be included in the RB, and may format the data into a plurality data REs. When wireless device 1000 is an example of a UE, the data identifying component may demodulate data contained in a received RB according to one or more parameters contained in the UE-specific control information.

The control information identifying component 1020, when wireless device 1000 is an example of a base station, may identify control information, which may be UE-specific control information for the RB. The control information may include, for example, one or more of a MCS indication, a RV indication, a NDI, a number of transmission layers, a scheduling parameter or a data acknowledgment. In some examples, the control information may include control information for two or more RBs within a TB, which may include control information for all RBs within the TB. The control information identifying component 1020, when wireless device 1000 is an example of a UE, may identify demodulate the control information, the control information including one or more parameters for use in demodulating the data.

The multiplexer 1035 may, when wireless device 1000 is an example of a base station, multiplex the one or more control REs with the plurality of data REs. The multiplexing may include FDM of one or more control REs with one or more data REs within one or more symbols of the RB. In some examples, the multiplexing may include frequency division multiplexing (FDM) of one or more control resource elements (REs) with one or more data REs within one or more symbols of the RB, time division multiplexing (TDM) of one or more control REs with one or more data REs within one or more symbols of the RB, and a combination of FDM and TDM of one or more control REs with one or more data REs within one or more symbols of the RB, or a combination thereof. In some examples, the one or more control RE is included in each symbol of the RB. In other examples, the one or more control RE is included in a first subset of symbols of the RB, and symbols of the first subset of symbols of the RB are time division multiplexed with one or more symbols of the RB that do not contain control information. In other examples, the one or more control RE is included in a second subset of symbols of the RB, and symbols of the second subset of symbols of the RB are frequency division multiplexed with one or more symbols of the RB that do not contain control information. In some examples, the multiplexing may include TDM and the control information is included in one or more control symbols of the RB. The one or more control symbols of the RB may be transmitted before transmission of one or more data symbols within the RB, or after transmission of one or more data symbols within the RB. In some examples, two or more control symbols may be transmitted, with a first control symbol transmitted before transmission of one or more data symbols within the RB and a second control symbol transmitted after transmission of the one or more data symbols within the RB. The first symbol of the control information in such examples may include the one or more parameters for use by the receiver in demodulating the RB and the second symbol of the control information may include one or more of a scheduling parameter, an uplink grant for a subsequent TTI (i.e., a subsequent slot), or a data acknowledgment.

The multiplexer 1035, when wireless device 1000 is an example of a UE, may demultiplex the control information and the data transmitted in the RB. Such demultiplexing may include, in some examples, demultiplexing one or more control REs containing the control information and one or more data REs containing the data. The control REs and the data REs may be multiplexed by TDM, FDM, or combinations thereof.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 or 1325 described with reference to FIGS. 12 and 13. The transmitter 1025 may utilize a single antenna, or it may utilize a plurality of antennas.

Figure 11:
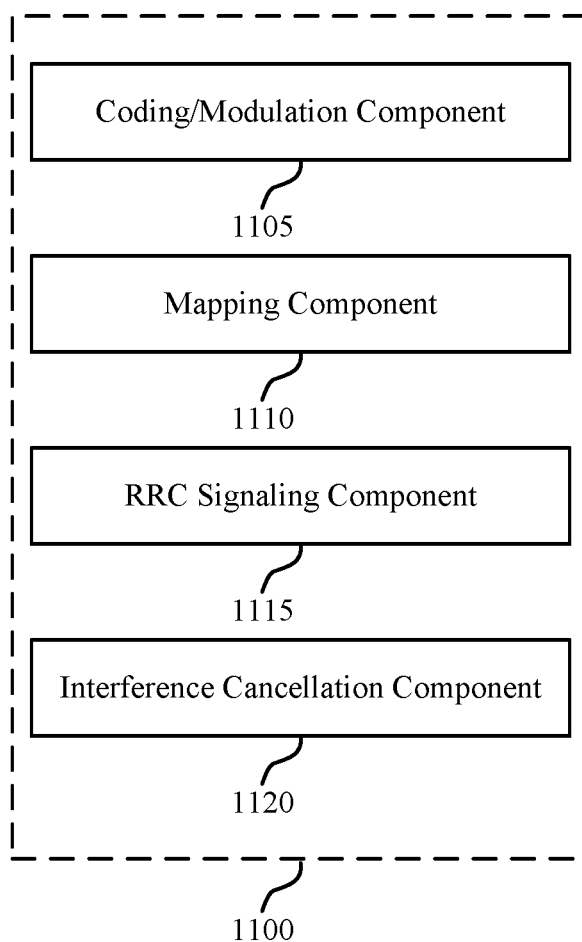

FIG. 11 shows a block diagram of a control channel communication manager 1100 which may be an example of the corresponding component of wireless device 900 or wireless device 1000 in accordance with one or more aspects of the present disclosure. That is, control channel communication manager 1100 may be an example of aspects of control channel communication manager 910 or control channel communication manager 1010 described with reference to FIGS. 9 and 10. The control channel communication manager 1100 may additionally or alternatively be an example of aspects of the UE control channel communication manager 1205 or base station control channel communication manager 1305 described with reference to FIGS. 12 and 13.

The control channel communication manager 1100 may include coding/modulation component 1105, mapping component 1110, RRC signaling component 1115, and interference cancellation component 1120. Each of these modules may communicate, directly or indirectly, with one another (e.g., via one or more buses).

The coding/modulation component 1105 may identify that the control information is modulated according to a fixed modulation scheme. In examples where the device 1100 is an example of a base station, the coding/modulation component 1105 may provide an indication of a MCS applied to the control information, which may be different than an MCS applied to the data to be transmitted to the receiver. In examples where the device 1100 is an example of a base station, the coding/modulation component 1105 may decode and demodulate downlink receptions according to an MCS applied to the communications. In some examples, the MCS may be indicated by a base station, and the MCS applied to the control information may be different than the MCS applied to the data.

The mapping component 1110 may perform mapping of one or more indicators to associated parameters. For example, an MCS of control information REs may be indicated in a one or two bit field in, for example, a DMRS or in common control information, and the bit value(s) of the field may be mapped to a particular modulation (e.g., QPSK) or coding scheme (e.g., TBCC) applied to the control information transmitted with the RB.

The RRC signaling component 1115 may provide or receive RRC signaling indicating, for example, SPS of a location of the control information within the RB. The RRC signaling component may additionally or alternatively provide or receive an indication of a MCS applied to the control information in some examples. In some examples, the RRC signaling component 1115 may provide a location of other control information for one or more MU-MIMO users that may be used for rate matching at the UE around the location of the other control information when demodulating the RB.

The interference cancellation component 1120 may, in some examples, apply interference cancellation on received transmissions. Such interference cancellation may be enhanced if the control information for the particular transmitted RB may be determined from the UE-specific control information. For example, if a MCS may be determined from control information of an interfering transmission, the interference cancellation component may use this information to select an interference cancellation algorithm for the interfering transmission.

Figure 12:
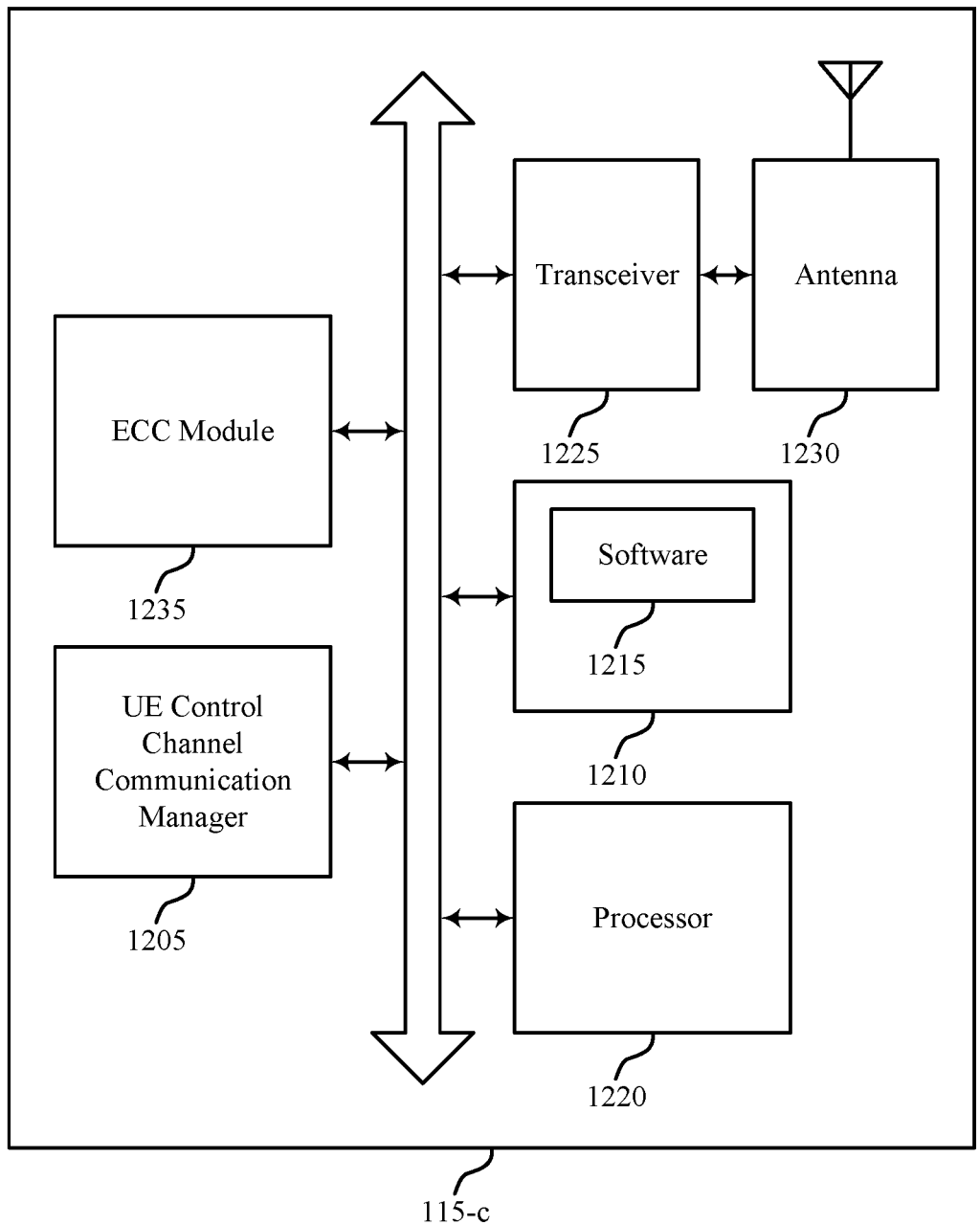
FIG. 12 illustrates a block diagram of a system including a UE that supports integrated control and data within RBs in accordance with one or more aspects of the present disclosure.

FIG. 12 shows a diagram of a system 1200 including a device that supports integrated control and data within RBs in accordance with one or more aspects of the present disclosure. For example, system 1200 may include UE 115-c, which may be an example of a wireless device 900, a wireless device 1000, or a UE 115 as described with reference to FIGS. 1, 2 and 8 through 11.

UE 115-c may additionally or alternatively include UE control channel communication manager 1205, memory 1210, processor 1220, transceiver 1225, antenna 1230 and ECC module 1235. Each of these modules may communicate, directly or indirectly, with one another (e.g., via one or more buses). The UE control channel communication manager 1205 may be an example of a control channel communication manager as described with reference to FIGS. 9 through 11.

The memory 1210 may include random access memory (RAM) and read only memory (ROM). The memory 1210 may store non-transitory computer-readable, computer-executable software including instructions that, when executed, cause the processor to perform various functions described herein (e.g., integrated control and data within RBs, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may additionally or alternatively include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The ECC module 1235 may enable operations using eCCs such as communication using shared or unlicensed spectrum, using reduced TTIs or subframe durations, or using a large number of CCs.

Figure 13:
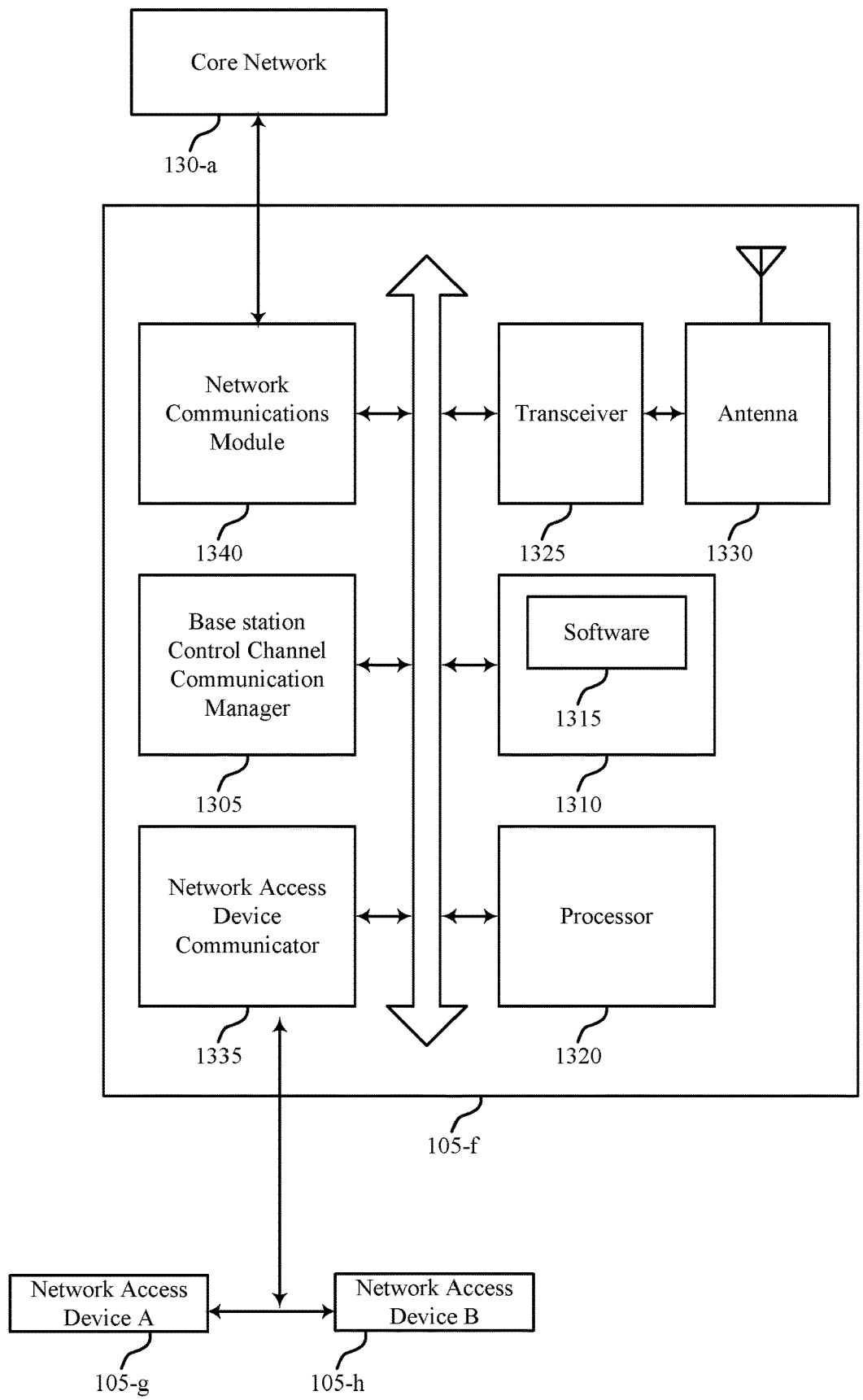
FIG. 13 illustrates a block diagram of a system including a base station that supports integrated control and data within RBs in accordance with one or more aspects of the present disclosure.

FIG. 13 shows a diagram of a wireless system 1300 including a device configured that supports integrated control and data within RBs in accordance with one or more aspects of the present disclosure. For example, system 1300 may include base station 105-f, which may be an example of a wireless device 900, a wireless device 1000, or an eNB or base station 105 as described with reference to FIGS. 1, 2 and 8 through 11. Base station 105-f may additionally or alternatively include components for bi-directional voice and data communications including components for transmitting communications and components for receiving communications. For example, base station 105-f may communicate bi-directionally with one or more UEs.

Base station 105-f may additionally or alternatively include base station control channel communication manager 1305, memory 1310, processor 1320, transceiver 1325, antenna 1330, network access device communicator 1335 and network communications module 1340. Each of these modules may communicate, directly or indirectly, with one another (e.g., via one or more buses). The base station control channel communication manager 1305 may be an example of a control channel communication manager as described with reference to FIGS. 9 through 11.

The memory 1310 may include RAM and ROM. The memory 1310 may store non-transitory computer-readable, computer-executable software including instructions that, when executed, cause the processor to perform various functions described herein (e.g., integrated control and data within RBs, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may additionally or alternatively include a modem to modulate the packets and provide the modulated packets to the antennas for transmission, and to demodulate packets received from the antennas. In some cases, the wireless device may include a single antenna 1330. However, in some cases the device may have more than one antenna 1230, which may be capable of concurrently transmitting or receiving multiple wireless transmissions.

The network access device communicator 1335 may manage communications with other network access devices 105, and may include a controller or scheduler for controlling communications with UEs in cooperation with other network access devices, such as network access device 105-g or network access device 105-h. For example, the network access device communicator 1335 may coordinate scheduling for transmissions to UEs for various control information transmission techniques.

The network communications module 1340 may manage communications with the core network (e.g., via one or more wired backhaul links). For example, the network communications module 1340 may manage the transfer of data communications for client devices, such as one or more UEs 115.

Figure 14:
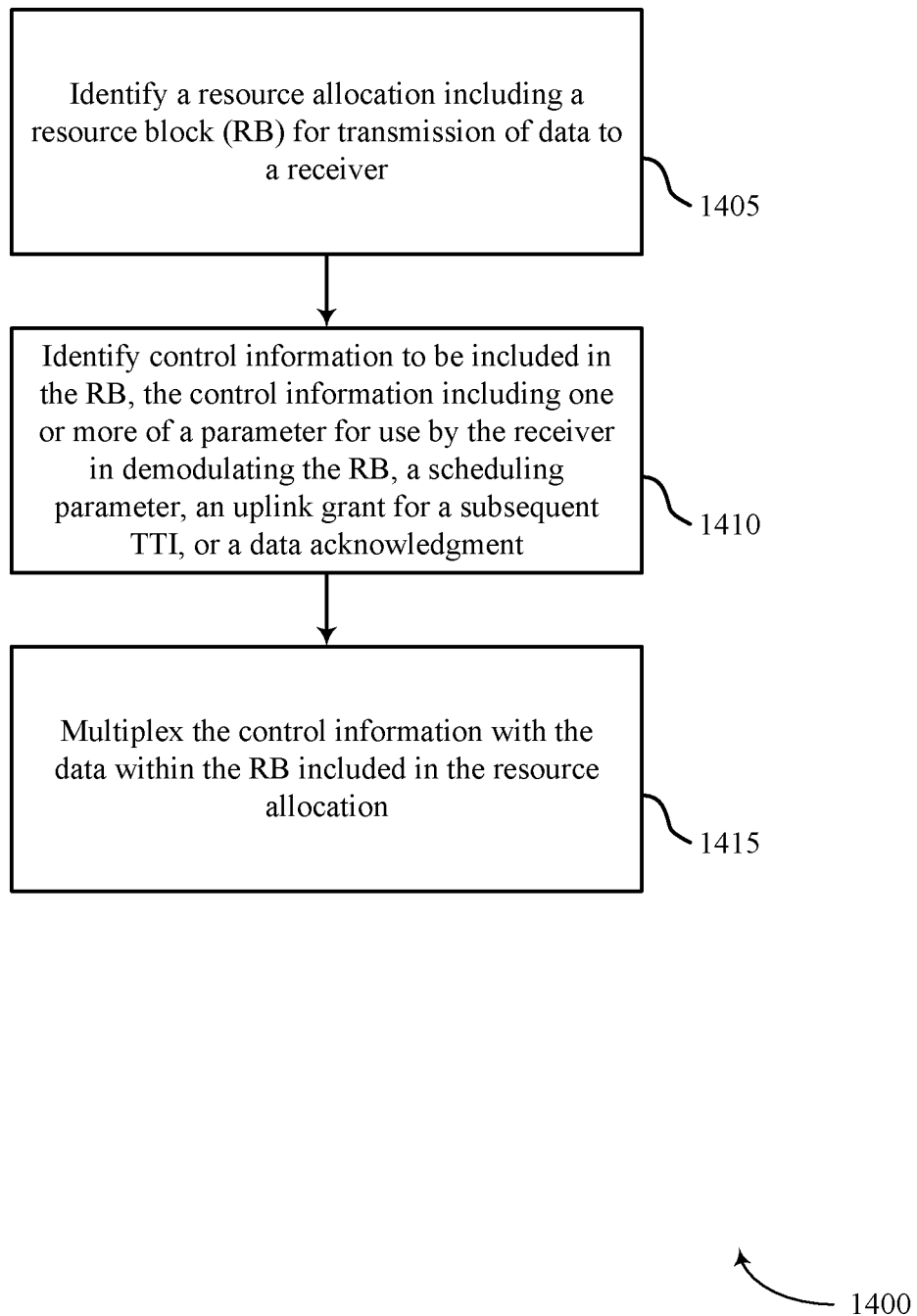
FIGS. 14 through 16 illustrate methods for integrated control and data within RBs in accordance with one or more aspects of the present disclosure.

FIG. 14 shows a flowchart illustrating a method 1400 for integrated control and data within RBs in accordance with one or more aspects of the present disclosure. The operations of method 1400 may be implemented by a device such as base station 105 or its components as described with reference to FIGS. 1 and 2. For example, the operations of method 1400 may be performed by the control channel communication manager as described herein. In some examples, the base station 105 may execute a set of codes to control the functional elements of the device to perform the functions described below. Additionally or alternatively, the base station 105 may perform aspects the functions described below using special-purpose hardware.

At block 1405, the base station 105 may identify a resource allocation including a RB for transmission of data to a receiver as described above with reference to FIGS. 2 through 8. In some examples, the operations of block 1405 may be performed by the data identifying component as described with reference to FIGS. 10 and 11.

At block 1410, the base station 105 may identify control information to be included in the RB. The control information may include one or more of a parameter for use by the receiver in demodulating the RB, a scheduling parameter, an uplink grant for a subsequent TTI, or a data acknowledgment, as described above with reference to FIGS. 2 through 8. In some examples, the operations of block 1410 may be performed by the control information identifying component as described with reference to FIGS. 10 and 11.

At block 1415, the base station 105 may multiplex the control information with the data within the RB included in the resource allocation, as described above with reference to FIGS. 2 through 8. In some examples, the operations of block 1415 may be performed by the multiplexer as described with reference to FIGS. 10 and 11.

Figure 15:
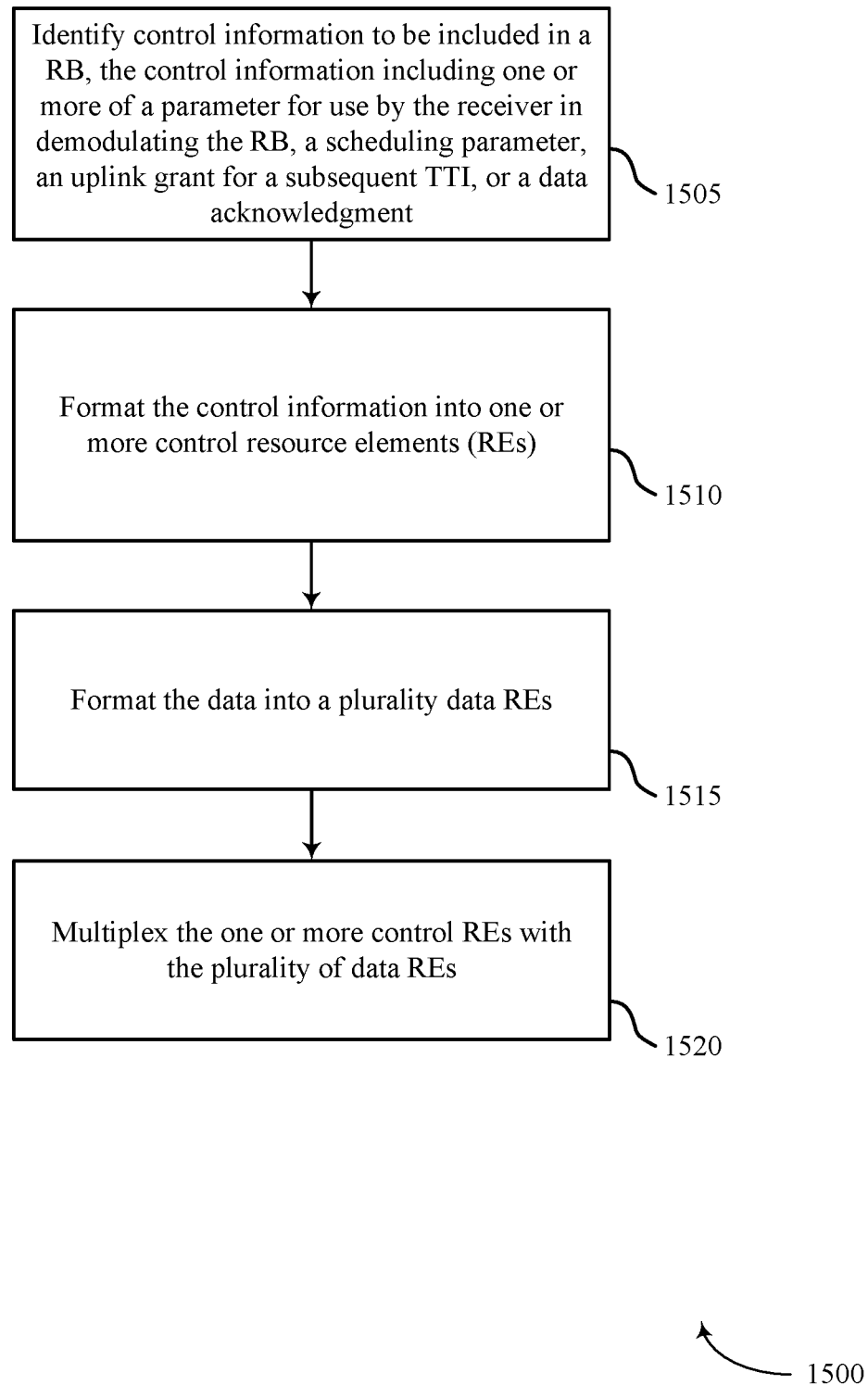

FIG. 15 shows a flowchart illustrating a method 1500 for integrated control and data within RBs in accordance with one or more aspects of the present disclosure. The operations of method 1500 may be implemented by a device such as base station 105 or its components as described with reference to FIGS. 1 and 2. For example, the operations of method 1500 may be performed by the control channel communication manager as described herein. In some examples, the base station 105 may execute a set of codes to control the functional elements of the device to perform the functions described below. Additionally or alternatively, the base station 105 may perform aspects the functions described below using special-purpose hardware.

At block 1505, base station 105 may identify control information to be included in a RB. The control information may include one or more of a parameter for use by the receiver in demodulating the RB, a scheduling parameter, an uplink grant for a subsequent TTI, or a data acknowledgment, as described above with reference to FIGS. 2 through 8. In some examples, the operations of block 1505 may be performed by the control information identifying component as described with reference to FIGS. 10 and 11.

At block 1510, the base station 105 may format the control information into one or more control REs, as described above with reference to FIGS. 2 through 8. In some examples, the operations of block 1510 may be performed by the control information identifying component as described with reference to FIGS. 10 and 11.

At block 1515, the base station 105 may format the data into a plurality data REs, as described above with reference to FIGS. 2 through 8. In some examples, the operations of block 1515 may be performed by the control information identifying component or the data identifying component, as described with reference to FIGS. 10 and 11.

At block 1520, the base station 105 may multiplex the one or more control REs with the plurality of data REs as described above with reference to FIGS. 2 through 8. In some examples, the operations of block 1520 may be performed by the multiplexer, as described with reference to FIGS. 10 and 11, to multiplex the control REs before data REs, within data REs, after data REs, or combinations thereof.

Figure 16:
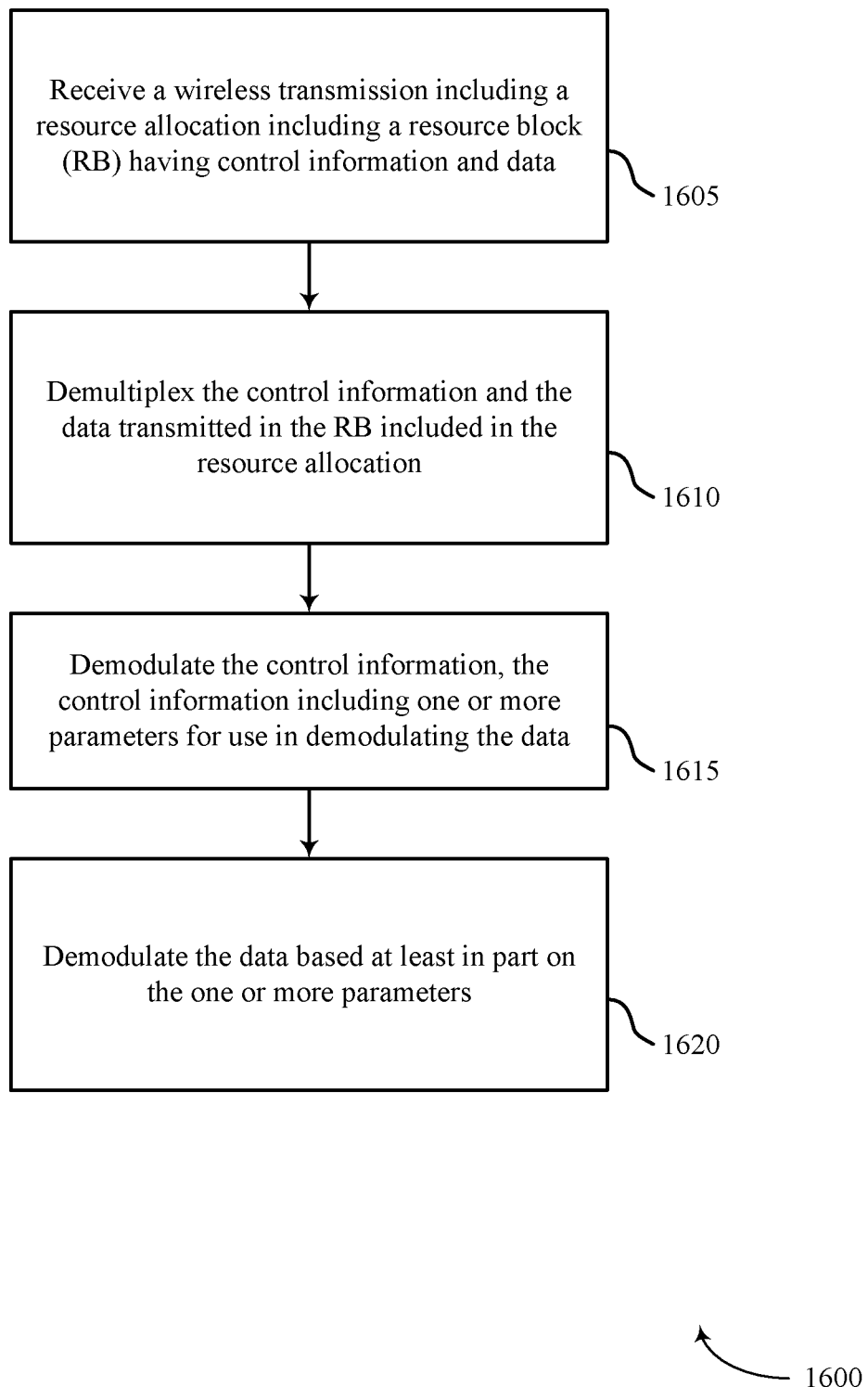

FIG. 16 shows a flowchart illustrating a method 1600 for integrated control and data within RBs in accordance with one or more aspects of the present disclosure. The operations of method 1600 may be implemented by a device such as a UE 115 or its components as described with reference to FIGS. 1 and 2. For example, the operations of method 1600 may be performed by the control channel communication manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive a wireless transmission including a resource allocation including a RB having control information and data, as described above with reference to FIGS. 2 through 8. In some examples, the operations of block 1605 may be performed by the receiver as described with reference to FIGS. 10 and 11.

At block 1610, the UE 115 may demultiplex the control information and the data transmitted in the RB included in the resource allocation, as described above with reference to FIGS. 2 through 8. In some examples, the operations of block 1610 may be performed by the multiplexer as described with reference to FIGS. 10 and 11.

At block 1615, the UE 115 demodulate the control information, the control information including one or more parameters for use in demodulating the data, as described above with reference to FIGS. 2 through 8. In some examples, the operations of block 1615 may be performed by coding/modulation component as described with reference to FIGS. 10 and 11.

At block 1620, the UE 115 may demodulate the data based at least in part on the one or more parameters, as described above with reference to FIGS. 2 through 8. In some examples, the operations of block 1620 may be performed by the coding/modulation component as described with reference to FIGS. 10 and 11.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone;

B alone; C alone; A and B in combination; A and C in combination; B and C in combination; or A, B, and C in combination. Additionally or alternatively, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be used to describe the base stations, for example. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell, for example, covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may additionally or alternatively be called forward link transmissions while the UL transmissions may additionally or alternatively be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for integrated control and data within RBs. It should be noted that these methods describe possible implementations, and that the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may additionally or alternatively be implemented, in whole or in part, with instructions embodied in a memory, formatted to be executed by one or more general or application-specific processors.

What is claimed is:

1. A method for wireless communication, comprising:
identifying a resource allocation including a first resource block (RB) for transmission of data to a first receiver of a plurality of receivers;
identifying control information to be included in the first RB, the control information being associated with the first receiver of the plurality of receivers;
transmitting, to the first receiver and a second receiver of the plurality of receivers, a transmission time interval (TTI)-level common control signal associated with the plurality of receivers, wherein the TTI-level common control signal indicates a first location of the control information associated with the first receiver within the first RB, the TTI-level common control signal including a second location of other control information associated with the second receiver; and
multiplexing the control information associated with the first receiver with the data within the first RB included in the resource allocation.

2. The method of claim 1, wherein the multiplexing comprises:
formatting the control information into one or more control resource elements (REs);
formatting the data into a plurality of data REs; and
multiplexing the one or more control REs with the plurality of data REs.

3. The method of claim 1, wherein the multiplexing comprises frequency division multiplexing (FDM) of one or more control resource elements (REs) with one or more data REs within one or more symbols of the resource allocation including the first RB, time division multiplexing (TDM) of the one or more control REs with the one or more data REs within the one or more symbols of the resource allocation including the first RB, a combination of FDM and TDM of the one or more control REs with the one or more data REs within the one or more symbols of the resource allocation including the first RB, or a combination thereof.

4. The method of claim 3, wherein one or more control RE is included in each symbol of the resource allocation including the first RB.

5. The method of claim 3, wherein the one or more control REs are included in a first subset of symbols of the resource allocation including the first RB, and symbols of the first subset of symbols of the resource allocation including the first RB are time division multiplexed (TDM) with other symbols of the resource allocation including the first RB that do not contain the control information.

6. The method of claim 3, wherein the one or more control REs are included in a second subset of symbols of the resource allocation including the first RB, and symbols of the second subset of symbols of the resource allocation including the first RB are frequency division multiplexed (FDM) with other symbols of the resource allocation including the first RB that do not contain the control information.

7. The method of claim 3, wherein one or more control symbols of the resource allocation including the first RB are transmitted before a transmission of one or more data symbols within the resource allocation including the first RB.

8. The method of claim 3, wherein one or more control symbols of the resource allocation including the first RB are transmitted after a transmission of one or more data symbols within the resource allocation including the first RB.

9. The method of claim 3, wherein one or more of control symbols of the resource allocation including the first RB are transmitted within a transmission of a plurality of data symbols within the resource allocation including the first RB.

10. The method of claim 3, wherein a first portion of the control information is transmitted in a first control symbol of the resource allocation including the first RB that is transmitted before a transmission of one or more data symbols within the resource allocation including the first RB, and a second portion of the control information is transmitted in a second control symbol of the resource allocation including the first RB that is transmitted after the transmission of the one or more data symbols within the resource allocation including the first RB.

11. The method of claim 1, wherein the control information further comprises one or more parameters for use by the first receiver in demodulating the resource allocation including the first RB.

12. The method of claim 11, wherein the control information further comprises one or more of a modulation and coding scheme (MCS) indication, a redundancy version (RV) indication, a new data indicator (NDI), a number of transmission layers, a scheduling parameter or a data acknowledgment.

13. The method of claim 1, wherein the resource allocation comprises multiple RBs, and wherein each of the multiple RBs includes at least a portion of the control information.

14. The method of claim 1, further comprising:
signaling the first location of the control information within the resource allocation including the first RB, wherein the signaling comprises one or more of a mapping in a downlink assignment, an indication in radio resource control (RRC) signaling, or an indication in a demodulation reference signal (DMRS).

15. The method of claim 1, wherein the control information is for the plurality of receivers in a multi-user multiple-input-multiple-output (MU-MIMO) system.

16. The method of claim 1, further comprising:
transmitting an indication of a modulation and coding scheme (MCS) applied to the control information, wherein the MCS applied to the control information is different than an MCS applied to the data to be transmitted to the first receiver.

17. A method for wireless communication, comprising:
receiving a wireless transmission including a resource allocation including a first resource block (RB) having control information and data, the control information being associated with a first receiver of a plurality of receivers;
receiving a transmission time interval (TTI)-level common control signal, the TTI-level common control signal being associated with the plurality of receivers, wherein the TTI-level common control signal indicates a first location of the control information associated with the first receiver within the first RB, the TTI-level common control signal including a second location of other control information associated with a second receiver of the plurality of receivers;
demultiplexing the control information associated with the first receiver and the data transmitted in the first RB included in the resource allocation;
demodulating the control information associated with the first receiver; and
demodulating the data based at least in part on the control information.

18. The method of claim 17, wherein the demultiplexing comprises:
demultiplexing one or more control resource elements (REs) containing the control information and one or more data REs containing the data.

19. The method of claim 18, wherein the one or more control REs and the one or more data REs are multiplexed by time division multiplexing (TDM), frequency division multiplexing (FDM), or combinations thereof.

20. The method of claim 17, wherein the control information further comprises one or more parameters for use in demodulating the data.

21. The method of claim 20, wherein the control information further comprises one or more of a modulation and coding scheme (MCS) indication, a redundancy version (RV) indication, a new data indicator (NDI), a number of transmission layers, a scheduling parameter or a data acknowledgment.

22. The method of claim 17, wherein the control information comprises information for subsequent transmission time intervals (TTIs).

23. The method of claim 17, further comprising:
receiving signaling indicating the first location of the control information within the resource allocation including the first RB, wherein the signaling comprises one or more of a mapping in a downlink assignment included in a downlink grant, radio resource control (RRC) signaling, or demodulation reference signal (DMRS) based signaling.

24. The method of claim 23, wherein the signaling further comprises the second location of the other control information for one or more multi-user multiple-input-multiple-output (MU-MIMO) users, the one or more MU-MIMO users comprising the second receiver, and wherein the method further comprises:
rate matching around the second location of the other control information when demodulating the resource allocation including the first RB.

25. An apparatus for wireless communication, comprising:
a processor;
memory coupled with the processor; and
instructions stored in the memory, the instructions being executable by the processor to:
identify a resource allocation including a first resource block (RB) for transmission of data to a first receiver of a plurality of receivers;
identify control information to be included in the first RB, the control information being associated with the first receiver of the plurality of receivers;
transmit, to the first receiver and a second receiver of the plurality of receivers, a transmission time interval (TTI)-level common control signal associated with the plurality of receivers, wherein the TTI-level common control signal indicates a first location of the control information associated with the first receiver within the first RB, the TTI-level common control signal including a second location of other control information associated with the second receiver; and
multiplex the control information associated with the first receiver with the data within the first RB included in the resource allocation.

26. The apparatus of claim 25, wherein the instructions are further executable by the processor to:
format the control information into one or more control resource elements (REs);
format the data into a plurality of data REs; and multiplex the one or more control REs with the plurality of data REs.

27. The apparatus of claim 25, wherein the instructions are further executable by the processor to perform frequency division multiplexing (FDM) of one or more control resource elements (REs) with one or more data REs within one or more symbols of the resource allocation including the first RB, time division multiplexing (TDM) of the one or more control REs with the one or more data REs within the one or more symbols of the resource allocation including the first RB, a combination of FDM and TDM of the one or more control REs with the one or more data REs within the one or more symbols of the resource allocation including the first RB, or a combination thereof.

28. An apparatus for wireless communication at a user equipment (UE), comprising:
   a processor;
   memory coupled with the processor; and
   instructions stored in the memory, the instructions being executable by the processor to:
      receive a wireless transmission including a resource allocation including a first resource block (RB) having control information and data, the control information being associated with a first receiver of a plurality of receivers;
      receive a transmission time interval (TTI)-level common control signal, the TTI-level common control signal being associated with the plurality of receivers, wherein the TTI-level common control signal indicates a first location of the control information associated with the first receiver within the first RB, the TTI-level common control signal including and a second location of other control information associated with a second receiver of the plurality of receivers;
      demultiplex the control information associated with the first receiver and the data transmitted in the first RB included in the resource allocation;
      demodulate the control information associated with the first receiver; and
      demodulate the data based at least in part on the control information.

29. The apparatus of claim 28, wherein the instructions are further executable by the processor to:
   demultiplex one or more control resource elements (REs) containing the control information and one or more data REs containing the data.

30. The apparatus of claim 29, wherein the one or more control REs and the one or more data REs are multiplexed by time division multiplexing (TDM), frequency division multiplexing (FDM), or combinations thereof.

* * * * *